US00RE40953E

(19) United States
(12) Reissued Patent
Scheibe

(10) Patent Number: US RE40,953 E
(45) Date of Reissued Patent: Nov. 10, 2009

(54) LIGHT-EMITTING DIODE DISPLAY

(75) Inventor: Paul O. Scheibe, Arroyo Grande, CA (US)

(73) Assignee: Landmark Screens, LLC, Palo Alto, CA (US)

(21) Appl. No.: 11/262,558

(22) Filed: Oct. 28, 2005

Related U.S. Patent Documents

Reissue of:
(64) Patent No.: 6,639,574
Issued: Oct. 28, 2003
Appl. No.: 10/045,096
Filed: Jan. 9, 2002

(51) Int. Cl.
*G09G 3/32* (2006.01)

(52) U.S. Cl. ..... 345/83; 345/590; 345/593; 345/594

(58) Field of Classification Search ..... 345/589, 345/690, 82, 83, 590, 393, 394
See application file for complete search history.

(56) References Cited

U.S. PATENT DOCUMENTS 3,638,215 A * 1/1972 Payne ..... 345/156
3,740,570 A * 6/1973 Kaelin et al. ..... 307/40
3,961,361 A * 6/1976 Avins et al. ..... 348/603
3,983,575 A * 9/1976 Nagai et al. ..... 348/603
4,110,792 A * 8/1978 Long et al. ..... 348/383
4,181,915 A * 1/1980 Lagoni ..... 348/570
4,181,916 A * 1/1980 Henderson ..... 348/570
4,323,896 A * 4/1982 Fiedler et al. ..... 345/691
4,742,387 A * 5/1988 Oshima ..... 348/658
4,769,708 A * 9/1988 Stoughton ..... 348/602
5,057,744 A * 10/1991 Barbier et al. ..... 315/10
5,134,387 A * 7/1992 Smith et al. ..... 345/83
5,272,518 A * 12/1993 Vincent ..... 356/405
5,278,542 A * 1/1994 Smith et al. ..... 345/690
5,450,301 A * 9/1995 Waltz et al. ..... 362/231
5,612,711 A * 3/1997 Rose ..... 345/59
5,708,452 A * 1/1998 Takahashi ..... 345/82
5,717,417 A * 2/1998 Takahashi ..... 345/82
5,726,672 A * 3/1998 Hernandez et al. ..... 345/22
5,751,263 A * 5/1998 Huang et al. ..... 345/82
5,786,803 A * 7/1998 Hernandez et al. ..... 345/600
5,796,376 A * 8/1998 Banks ..... 345/82
5,812,105 A * 9/1998 Van de Ven ..... 345/83
5,835,269 A * 11/1998 Natori ..... 359/448
5,836,676 A * 11/1998 Ando et al. ..... 362/244
5,896,114 A * 4/1999 Imamura et al. ..... 345/55
5,900,850 A * 5/1999 Bailey et al. ..... 345/55
5,969,704 A * 10/1999 Green et al. ..... 345/634
5,990,802 A * 11/1999 Maskeny ..... 340/815.45
6,016,038 A * 1/2000 Mueller et al. ..... 315/291
6,026,435 A * 2/2000 Enomoto et al. ..... 709/217
6,058,634 A * 5/2000 McSpiritt ..... 40/452
6,081,073 A * 6/2000 Salam ..... 315/169.2
6,097,367 A * 8/2000 Kuriwaki et al. ..... 345/589
6,101,750 A * 8/2000 Blesener et al. ..... 40/448
6,157,361 A * 12/2000 Kubota et al. ..... 345/100
6,486,923 B1 * 11/2002 Maeshima et al. ..... 348/649
2002/0070681 A1 * 6/2002 Shimizu et al. ..... 315/246

* cited by examiner

*Primary Examiner*—Ricardo L Osorio
(74) *Attorney, Agent, or Firm*—Haynes and Boone, LLP

(57) ABSTRACT

The present invention relates to a light-emitting diode ("LED") display apparatus used for a display such as a type of standing signboard. The light-emitting diode display is comprised of light-emitting diodes which use a plurality of colors, including blues, reds and greens, arranged in a specific pattern such as a matrix pattern. The display is appropriate for displaying either a moving or a stationary graphical image by powering the LEDs to combine to produce specific colors.

66 Claims, 17 Drawing Sheets

LIGHT-EMITTING DIODE DISPLAY

Matter enclosed in heavy brackets [ ] appears in the original patent but forms no part of this reissue specification; matter printed in italics indicates the additions made by reissue.

FIELD OF THE INVENTION

The present invention relates to a light-emitting diode ("LED") display apparatus. More particularly this invention relates to a light-emitting diode display apparatus used for a display such as a type of a standing signboard and methods for controlling same.

BACKGROUND OF THE INVENTION

In conventional LED displays three well-chosen primary colors are used to produce a wide range of colors. The three well-chosen primary colors, when added together in the appropriate proportions, can approximate many of the colors that a human can perceive. This is a thoroughly studied area of human perception that is explained by the fact that the human eye perceives color using three different types of sensors called cones. A human perceives color when any or all of these three types of cones are stimulated. Theoretically, if three light sources, in this case LEDs, can individually stimulate these three different kinds of cones, all human perceivable colors could be duplicated. In practice, however, light sources because of certain deficiencies, cannot produce the stimuli needed to reproduce all colors.

An LED display is typically made up of various dots arranged in a matrix pattern having rows and columns. The dots are usually called pixels where the pixels are made up of several LEDs. The individual LEDs emit light of three basic colors: red, green and blue. Typically, each pixel is composed of at least one LED of each color. The intensity of the LEDs is usually controlled by controlling the current to the individual LEDs. This is sometimes referred to as controlling the drive to an LED. A pixel can produce a specific perceived color by varying the drive to the three colors of LEDs that comprise the pixel. Thus, by controlling the current drive to each of the LEDs that makes up a pixel and in turn controlling each of the pixels that make up a matrix of pixels, an LED display device is capable of displaying a plurality of colors and light intensities so as to realize, for example, a multi-color display. A large LED display can contain hundreds of thousands of pixels and millions of LEDs.

In an LED display, each of the pixels and each of the LEDs must be controlled. Accordingly, prior art systems utilize a display driver in conjunction with a decoder and microprocessor for controlling the device to each LED of a display. U.S. Pat. NO. 5,612,711 (the "711" patent), entitled "Display System," describes an example of such a prior art system. The '711 patent discloses an apparatus and method for driving LEDs of different colors in a matrix of pixels. Differently colored LEDs are commonly connected so that a voltage applied to one LED is applied to all the commonly connected LEDs. Drivers provide different voltages to different color LEDs in the matrix of LEDs. A processor controls the overall operation of the LED display.

Prior art displays, however, suffer from several deficiencies. Prior art LED displays that use three color of LEDs have a limited color gamut, significantly less than that able to be perceived by humans. Furthermore, prior art systems suffer from poor quality control in the transferring of original artwork to a display medium such as an LED display.

Prior art systems also suffer from undesirable artifacts such as contouring due to inappropriate luminance control at low brightness. Undesirable artifacts due to increments in dynamic range are called "contouring" because the increments in intensity produce what looks like flat regions in brightness with jumps or increments that look like contour lines.

SUMMARY OF THE INVENTION

A light-emitting diode display according to the present invention is generally comprised of light-emitting diodes ("LEDs"), which use a plurality of colors including blues, reds, and green arranged in a specific pattern such as a matrix pattern. The display is appropriate, inter alia, for displaying moving or stationary images by powering the LEDs so that light from individual LEDs combine to produce the desired color, brightness and spatial patter of light.

One aspect of the invention is a method for displaying an image on a light-emitting diode (LED) display. In the embodiment, the display comprising a matrix of pixels, each pixel made up of at least four LEDs each capable of emitting light at an individual chromacity. The method specifies a color to be displayed at a pixel and at least one desired operating characteristic for said pixel is selected. The method identifies a plurality of color gamuts containing said specified color, each color gamut being defined by a different set of said at least four LEDs of said pixel and being associated with at least one operating parameter. The method further selects from said plurality of color gamuts the color gamut having at least one operating parameter most closely corresponding to said at least one desired operating characteristic. The method then generates said specified color within said selected color gamut.

In alternative embodiments one of said plurality of color gamuts is defined by at least four LEDs. Also, the desired operating characteristic includes at least one of minimized power consumption, minimized current draw, minimized time usage and maximized brilliance. In another embodiment, the at least one desired operating parameter includes at least one of power consumption, current draw, on/off state and brilliance. An in still another alternative embodiment, the method selects a specific LED within a pixel for which an operating parameter is to be optimized and selects the color gamut most closely associated with said optimized operating parameter.

Another aspect of the invention is a method for displaying an image on a light-emitting diode display. In this method the display has a first set of light-emitting diodes capable of emitting light having a first set of chromacities and the first set of chromacities is equal to or greater than four. The method of the invention includes identifying at least one light-emitting diode capable of emitting light having a at least one chromacity for which an operating parameter is to be minimized. The method then identifies a first region of chromacity with a first boundary available through operation of the at least one light-emitting diode and a first subset of said first set of light emitting diodes capable of emitting light having a first subset of chromacities. The method further identifies a second region of chromacity with a second boundary available through operation of a second subset of light emitting diodes capable of emitting light having a second subset of chromacities. When a color is specified, the method determines whether the desired color resides within the second boundary. If the desired color resides within the second boundary, the method generates the desired color using the second subset of light-emitting diodes, thereby minimizing the operating parameter. Alternatively, if the desired color does not reside within the second boundary, the method generates the desired color using said at least one light-emitting diode and the second set of light-emitting diodes.

According to another embodiment of the invention, a light-emitting diode display is described. The light-emitting diode display includes a plurality of pixels arranged in a plurality of rows and columns to display a predetermined image. The plurality of pixels is composed of a first set of light-emitting diodes capable of emitting light having a first set of chromacities which are capable to or greater than four. The light-emitting diode display also includes digital input circuitry to input a digital signal for a desired color and a desired luminance. A digital-to-analog then capable of converting the digital signal to an analog signal. Control electronics is then capable of driving the plurality of pixels. The invention further includes a threshold operator capable of determining whether the desired color is within a first region of chromacity with a first boundary. The first region is available through operation of at least one light-emitting diode capable of emitting light having a first chromacity and a second set of light emitting diodes capable of emitting light having a second set of chromacities. The threshold operator is further capable of determining whether the desired color is within a second region of chromacity with a second boundary available through operation of third set of light emitting diodes having a third set of chromacities. The third set does not include the first light-emitting diode and, wherein the third set of light-emitting diodes is less than or equal to the first set.

In an alternative embodiment of the invention, the desired color is within the first region of chromacity and the control electronics drives the at least one light-emitting diode and the second set of light-emitting diodes to generate the desired color. In another embodiment, the desired color is within the second region of chromacity and the control electronics drives the third set of light-emitting diodes to generate the desired color. In yet another embodiment, the control electronics implements a non-linear control function which may include polynomial, exponential, or piece-wise linear function.

According to another embodiment, the invention is an image transfer interface that includes calibrating a workstation display and developing an image on said workstation display. The method then converts the image to a digitally specified image, wherein the digitally specified image is in accordance with a standard. The digital image is then transferred to a recipient that maps the digitally specified image to an light-emitting diode display.

In alternative embodiments, the standard is a CIE standard including the CIELAB standard. In another embodiment, the light-emitting diode display is calibrated. A computer network may be used for transferring the digitally specified image.

Alternative embodiments of the invention include implementing the methods of the invention on a computer having a memory and a processor. Other embodiments implement the methods of the present invention using more than one distributed computer.

The present invention further includes a fault tolerant method for displaying images on an light-emitting diode display. The method includes inputting a first image, displaying the first image. Upon detecting the absence of a second image, the method inputs a default image; and displays the default image. In another embodiment, the default image is a set of default images.

These and other aspects of the invention will become apparent to those skilled in the art upon reading and understanding the following detailed description with reference to the accompanying figures.

BRIEF DESCRIPTION OF THE DRAWINGS

The present invention will be described in more detail in conjunction with the accompanying drawings, wherein.

DETAILED DESCRIPTION OF THE INVENTION

Figure 1:
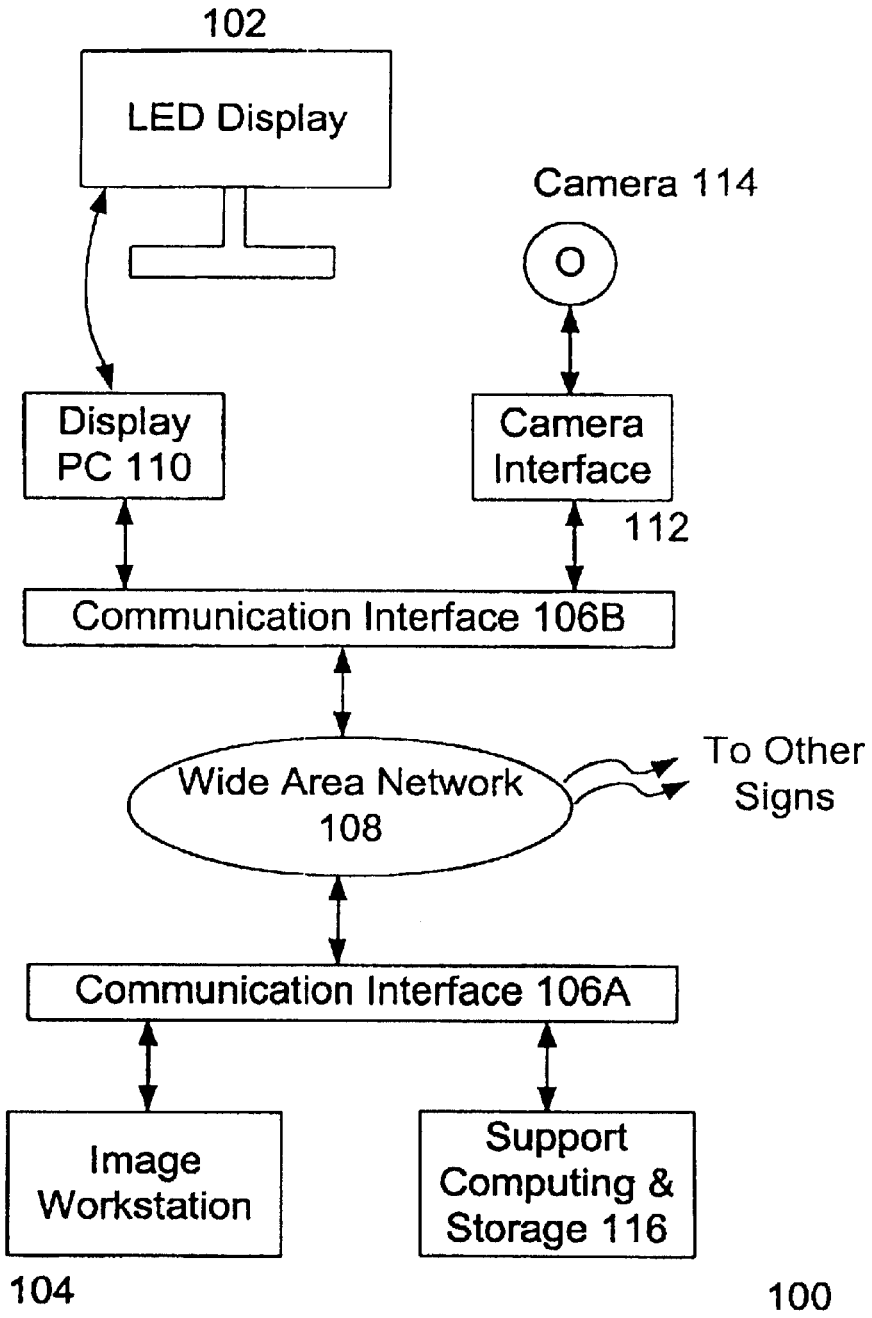
FIG. 1 is a block diagram of the architecture of an embodiment of the present invention.

As shown in FIG. 1, LED display 102 is controlled by image workstations 104 through various links and interfaces. LED display 102 can take various forms while remaining within the teachings of the invention. In a preferred embodiment, LED display 102 is a large display appropriate for outdoor use and installation as a billboard. In another embodiment of the invention, LED display 102 is used as a jumbo screen at sporting events including outdoor and indoor applications. In an embodiment of the invention that is compatible with color television, the LED display 102 is capable of displaying 60 complete images per second and is further capable of displaying the color gamut of television. Moreover, the teachings of the invention are applicable to monitors for use as computer displays. In one embodiment, image workstation 104 is a computer that provides a user interface to display system 100. In other embodiments, the functions of image workstation 104 are distributed to various computers. And in yet another embodiment, the functions of image workstation are contained within self-contained hardware such as a PC card.

In the embodiment shown in FIG. 1, image workstation 104 is operated remotely from LED display 102, however, one of skill in the art will understand that other configurations may be employed without deviating from the teachings of the invention. As shown in FIG. 1, image workstation 104 is locally connected to first communication interface 106A, which can be in the form of a local area network (LAN) or other suitable interface. Communication interface 106A is in turn connected to a wide area network (WAN) 108 that allows for communication with LED display 102, which is remotely located. Wide area network 108 is then connected to a second communication interface 106B. As with communication interface 106A, communication interface 106B can, but need not be, a local area network or other suitable interface. In the embodiment being described, display PC 110 is connected to communication interface 106B. Display PC 110 then controls the displaying of images on LED display 102. Image workstation 104 and display PC 110 can be implemented as digital computers having at least a memory for storing and image computer code, and a processor for executing code. Image workstation 104 and display PC 110 may be very similar in operation. However, because they may have different assigned tasks according to the invention, image workstation 104 and display PC 110 may have different features and performance capabilities.

One of ordinary skill in the art will understand that the communication elements of FIG. 1 including communication interfaces 106A and 106B and wide area network 108 can be replaced with other communicating elements. When used as a public billboard, it is inevitable that some of the communicating elements may be susceptible to tampering. Accordingly, it is important to use security encryption and virtual private networks (VPNs). Moreover, as communications technology advances other communicating elements will become available. For example, an embodiment of display system 100 provides for a direct communication link between image workstations 104 and LED display 102.

As further shown in FIG. 1, another embodiment of the invention includes camera 114 to be used in a feedback control system. Camera interface 112 is connected to communication interface 106B and camera 114 to provide a monitoring function for LED display 102. Camera 114 may be part of a feedback control system that continuously monitors LED display 102 and adjusts the inputs to LED display 102 for optimal display and viewing. In a preferred embodiment of the invention, camera 114 operates to detect the light pattern on LED display 102 to produce a digital representation of the distribution of brightness and color on the sign. The present invention then uses this information to correct, on a pixel-by-pixel basis, any deviations from the pattern that was intended to be displayed. Camera 114 is also used to detect display malfunctions such as fault detection and provides technical measurements used in the pre-production ad production of original content displayed on LED display 102. In another embodiment, camera 114 is a digital camera capable of viewing the entire LED display 102. Moreover, the digital camera is capable of operating over the entire brightness range of LED display 102. This operation may be accomplished through the use of aperture control or the use of neutral density filters. In an embodiment, the dynamic range of camera 114 is at least 2000:1.

Field-of-view of camera 114 is preferably adjustable from an area containing less than 32×32 pixels on LED display 102 to about 30% more than the entire width of LED display 102. For proper operation, the output of camera 114 is at least an array of 360×360 pixels. In another embodiment, camera 114 is operated in timing with the display so that images are taken during intervals when LED display 102 is blank or when LED display 102 is displaying an image.

In an embodiment of the invention implementing the feedback control system, on a bright day, the feedback control system increases the magnitude of the inputs to LED display 102, whereas on a dark, moonless night, the feedback control system decreases the magnitude of the inputs to LED display 102. An appropriate sensor for use in the feedback control system is a photocell. The current through the photocell can be calibrated for various brightness levels. Moreover, display PC 110 and/or image workstation 104 may have stored on them various versions of the same image such that an optimal display image can be displayed for its preferred contrast or brightness effects. The control functions of the feedback control system are executed by display PC 110 in an embodiment of the invention. In another embodiment, the control functions are executed by image workstation 104. In yet another embodiment, support and computing storage 116 executes the control functions. Support and computing storage 116 may be implemented as similar to image workstations 104 or display PC 110, however, because it may have very difficult tasks assigned to it, support and computing storage 116 may have different features and performance capabilities. In an embodiment support and computing storage 116 is a large bank of hard disk media with high speed processing capabilities for the operation and management of many LED displays 102.

In an alternative embodiment of the invention, a plurality of displays such as LED display 102 are controlled by image workstation 104. Furthermore, additional support computing and storage 116 may be provided to increase the processing capabilities of display system 100. It will be apparent to those of skill in the art that display system 100 as illustrated is but one embodiment of the present invention and that modifications can be made without deviating from the invention.

Image data, control data, status data and exceptions may be communicated over the described communicating elements of display system 100. Standard IETF network protocols such as TCP/IP are used to communicate from the image workstation 104 to LED display 102. Tasks that are performed over the communication links include transferring images, establishing image display sequences, reporting the status of operations, and receiving of error signals. In a preferred embodiment, all functionality of the LED display 102 is controlled at image workstation 104, remotely located from LED display 102. However, in another embodiment, image workstation 104 is collocated with LED display 102, where image workstation 104 further executes the tasks of display PC 110.

In the embodiment of FIG. 1, display PC 110 controls the sequence of images displayed on the sign, gathers status data and provides a record of the actual images shown with associated time and other ancillary data. In advance of transmission to LED display 102, image workstation 104 processes images from, for example, advertising agencies in preparation for transmission to LED display 102. Moreover, image workstation 104 establishes the desired image sequences to be shown on LED display 102. As part of its functionality, image workstation 104 can query the status of display PC 110, LED display 102, and camera 114.

Figure 9A:
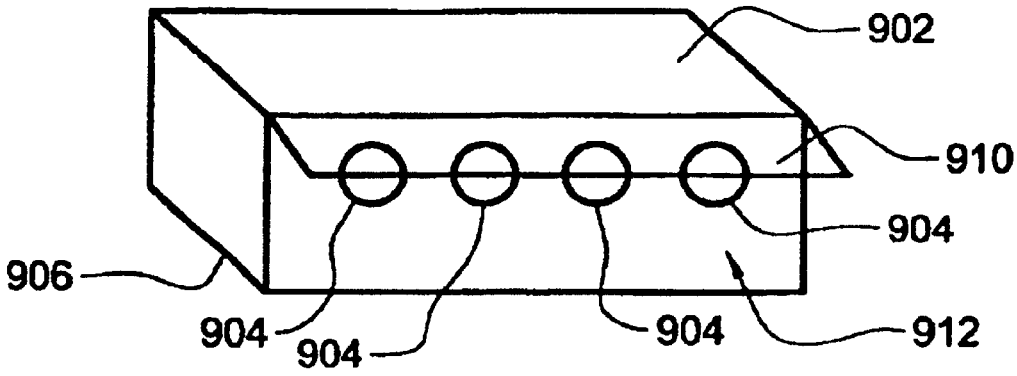
FIGS. 9A and 9B are perspective drawings of a pixel block according to an embodiment of the invention.
Figure 9B:
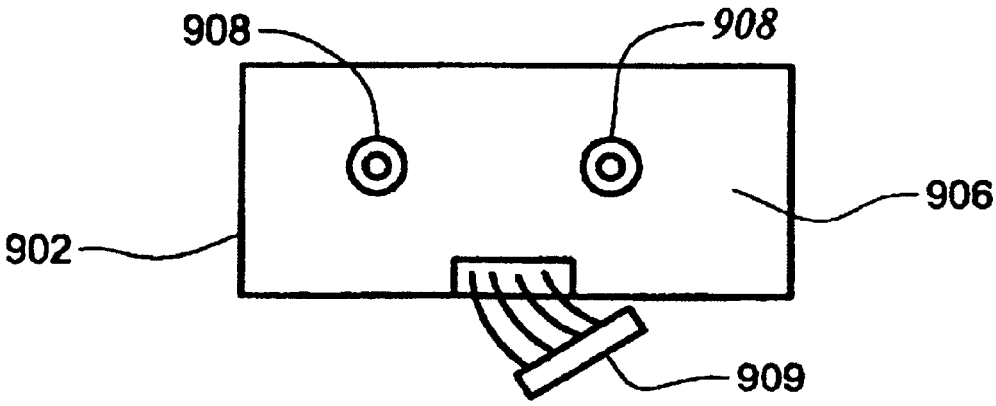
Figure 9C:
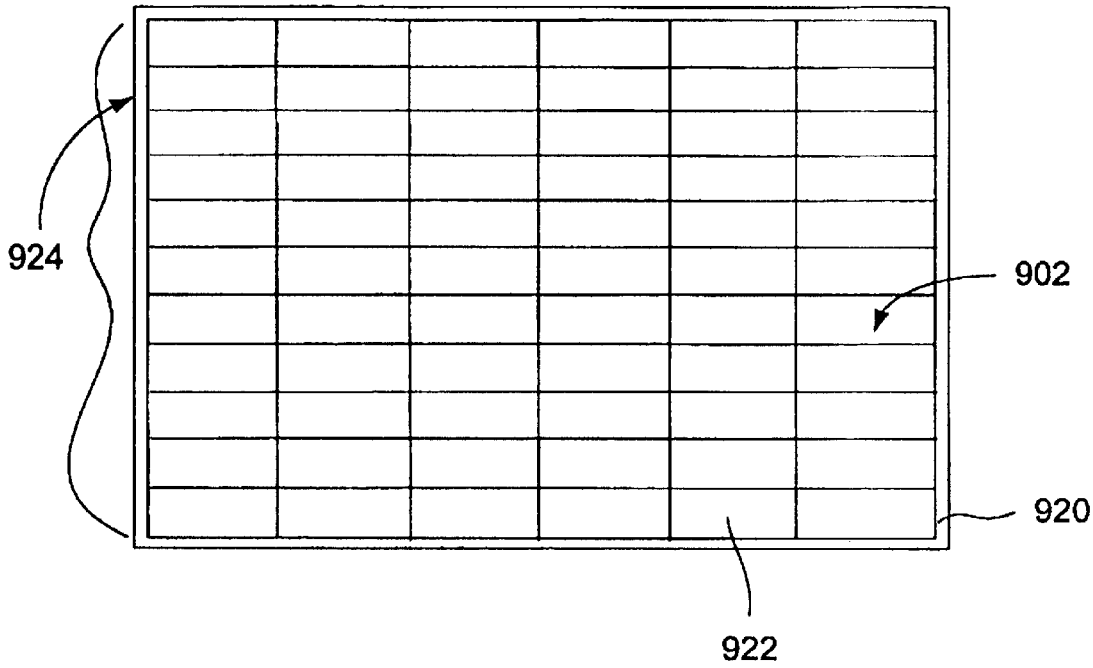
FIG. 9C is a drawing of a subassembly grid according to an embodiment of the invention.

According to a preferred embodiment of the invention, LED display 102 comprises a matrix of discrete elements called pixels. FIG. 9A shows subassembly 902 comprising four pixels 904. The four pixels are contained within multiple pixel block 906 which, as shown in FIG. 9B, has mounting apertures 908 on the back. As shown in FIG. 9B, connector 909 extends from multiple pixel block 906. Connector 909 is used to supply drive signals to the pixels including the multiple elements of the pixels, which are LEDs in the preferred embodiment of the invention. Referring to FIG. 9C, subassembly grid 920 is configured to receive a plurality of subassemblies 902 arranged in rows and columns. Mounting apertures 908 are used to mount subassemblies 902 to frame 924, the back of which is not shown in the FIG. In this way, pixels are arranged in a matrix of rows and columns.

Referring back to FIG. 9A, multiple pixel block 906 further has louver 910. Advantageously, louver 910 shades the pixels from direct sunlight thereby reducing the required drive to create a perceived brightness or contrast. Louver 910 can reduce the viewing angle from above, however, because LED display 102 is generally to be viewed from directly in front or from below, louver 910 generally does not create a reduction in performance. Where viewing is desired from above, louver 910 can be removed. To further improve the performance of LED display 102, low reflectance resin 912 may be used to fill in spaced between the pixels. Furthermore, the body of multiple pixel block 906 is preferably made of low reflectance plastic.

Figure 10A:
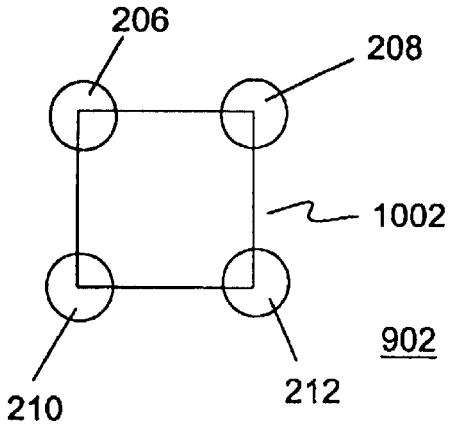
FIGS. 10A–D are patterns for building a pixel according to embodiments of the invention.
Figure 10B:
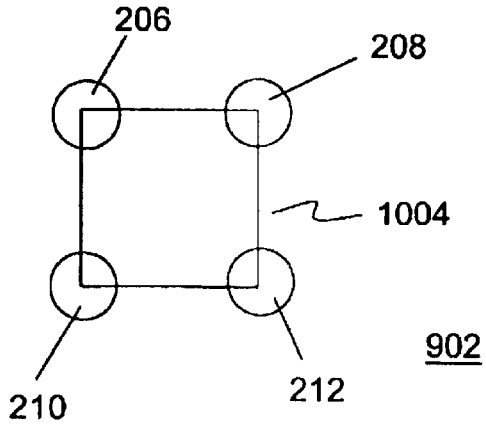
Figure 10C:
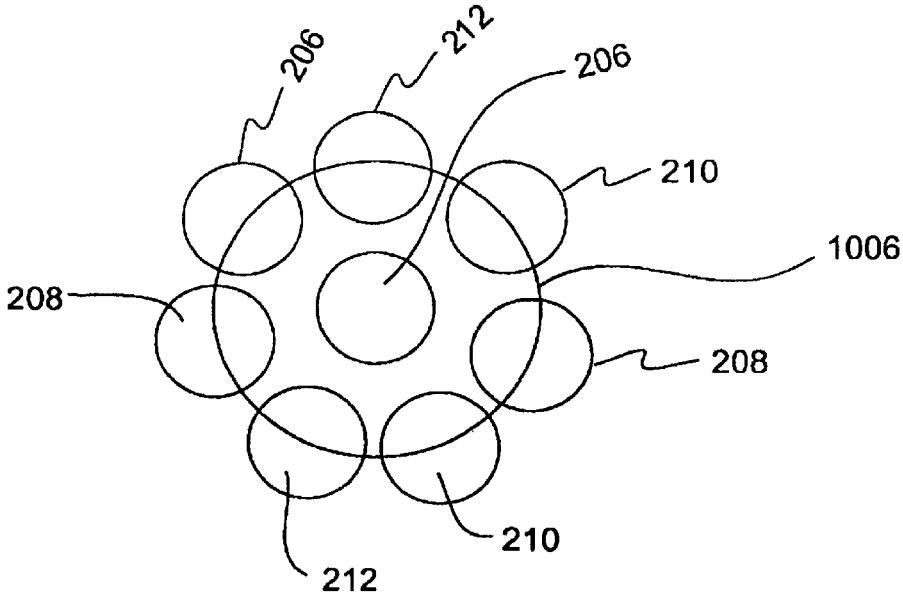

FIG. 10A, shows the elements comprising a pixel 904 according to an embodiment of the invention. As shown in FIG. 10A, pixel 904 is comprised of multiple LEDs including red LED 206, first green LED 208, a second green LED 212 and blue LED 210. Note that second green LED 212 has a different chromaticity than first-green LED 208. As shown in FIG. 10A, the four-colored LEDs are configured in a square pattern. FIG. 10B shows the four LEDs in a denser pattern achieved by offsetting a square pattern to form a diamond pattern 1004. FIG. 10C also shows a four-colored pixel according to an alternative embodiment. The four colors are provided by a total of eight LEDs configured in a circular scattered pattern in pixel 908.

It has been found that the scattering of the four LEDs improves the human perceived chromacity emitted from the pixel 904. According to an embodiment of the invention, the number of LEDs used for each of the four different colors is not equal. This is due to different performance qualities of the LEDs used. For example, blue and red are at extremes of human perceptible colors and therefore more LEDs may be necessarily to create the same intensity as with, for example, green, white is near the middle of the range of human perceptible colors. Moreover, LEDs are sometimes produced from different materials with different performance qualities. For example, red LEDs are typically made from arsenide alloys which produce a bright LED whereas blue and greens are often produced using nitride alloys which produce a less bright LED. Furthermore, the advent of A1InGaP LEDs for colors between red and yellow-orange produces a very bright output. Accordingly, the number and scattering of LEDs within a scattered pixel such as pixel 908 is arranged according to the performance of the LEDs in use. For example, a higher number of low brightness LEDs can be included while reducing the number of high brightness LEDs. In this manner, more uniform intensity is achieved for a wide color gamut. As new semiconductor materials are developed and as LED technology progresses different patterns can be used.

Figure 10D:
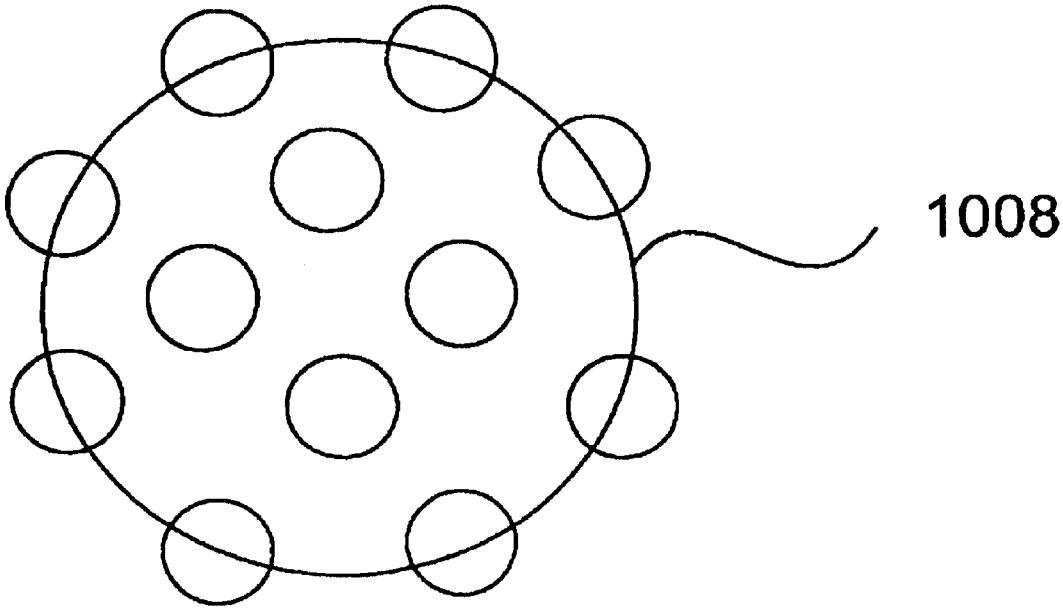

FIG. 10D illustrate another circular pattern of LEDs according to an embodiment of the invention. By increasing the number of LEDs, this pattern allows for including different proportions of specific LED colors in greater variety. In pixel 1008, LEDs of a specific color are included in higher or lower numbers depending on the LEDs' performance characteristics.

Figure 11:
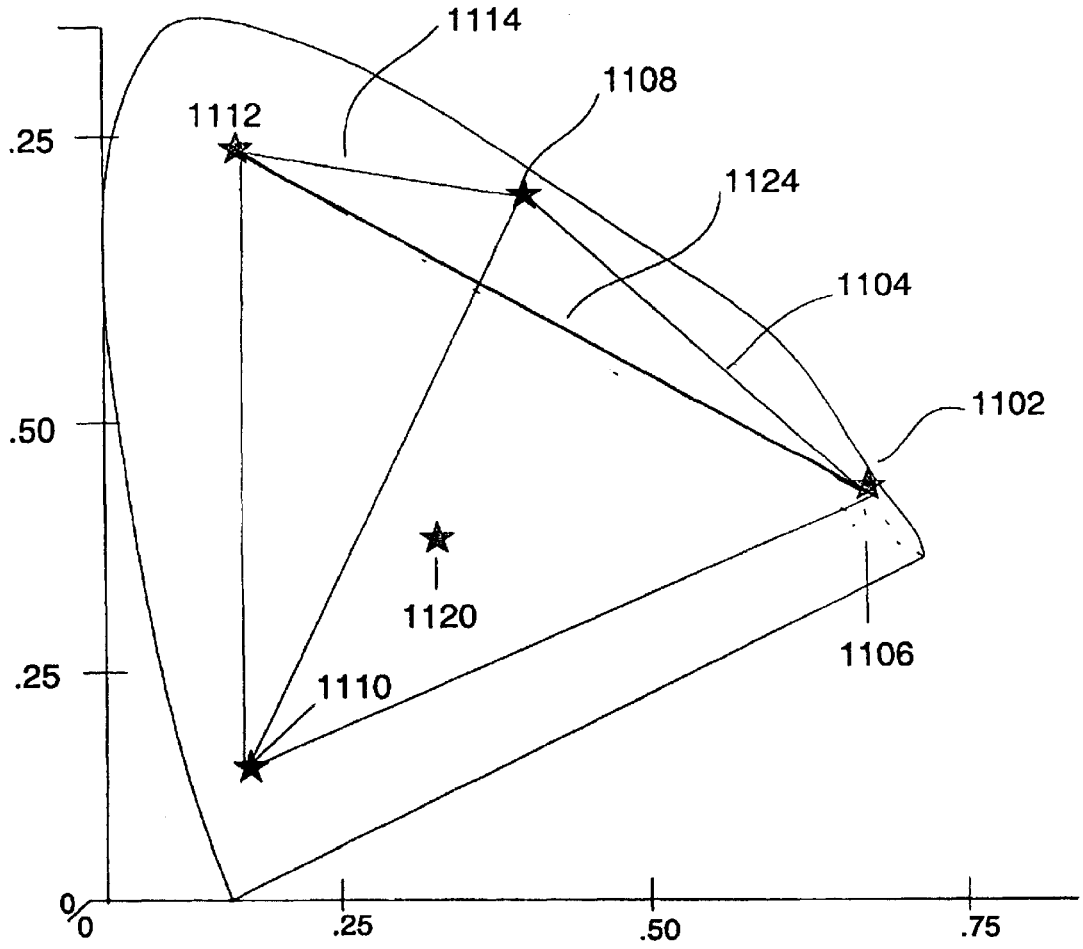
FIG. 11 is a CIE diagram depicting the chromacity performance of multi-color LED according to an embodiment of the invention.

As is known in the art to which it pertains, about 50% of the just-noticeable different colors can be produced by three LED colors. The use of three LED colors, however, cannot produce all human perceptible colors as previously explained. This can be understood with reference to FIG. 11 which is taken from CIE (Commission International de l'Eclairage) data. As shown in FIG. 11, boundary 1102 represents the limits of human perceptible color. Typical humans can perceive all colors within boundary 1102, but cannot perceive colors outside of boundary 1102.

Using LEDs of three different colors, a triangular boundary 1104 is produced having vertices at red LED 1106, first green LED 1108 and blue LED 1110. The points corresponding to red LED 1106, first green LED 1108 and blue LED 1110 corresponds to the chromacity of a specified red, green and blue LED respectively. Triangular boundary 1104 represents the limits of colors that can be produced using these three colors. The illustrated three-color combination can therefore produce colors within triangular boundary 1104, but cannot produce colors outside triangular boundary 1104.

According to the present invention, a greater range of perceptible colors is produced by including a fourth color in each pixel. If a fourth LED, in this example second green LED 1112, is added to the system describe immediately above, a quadrilateral boundary 1114, connecting points 1106, 1108, 1110 and 1112, is produced. The addition of second green LED 1112 significantly enriches the gamut of greens and deep greens. This improved system can therefore produce colors within quadrilateral boundary 1114 which is larger than triangular boundary 1104. Importantly, the color range outside quadrilateral boundary 1114 is smaller than for the triangular boundary 1104.

In a preferred embodiment of the present invention, the performance and chromacity of the LEDs may be specified as follows: red LED 1106 has CIE chromacity coordinates near the 660 nm monochrome point with (x, y)=(0.730, 0.270) (where the (x, y) values are expressed according to the CIE standard): first green LED 1108 has chromacity components near the 545 nm monochrome point (x, y)=0.266, 0.724); second green LED 1112 has chromacity components near 506 nm monochrome point (x, y)=(0.004, 0.655); and, blue LED 1110 has chromacity components near 465 nm monochrome point (x, y)=(0.135,0.040). Other specifications will be apparent to those skilled in the art.

Figure 4:
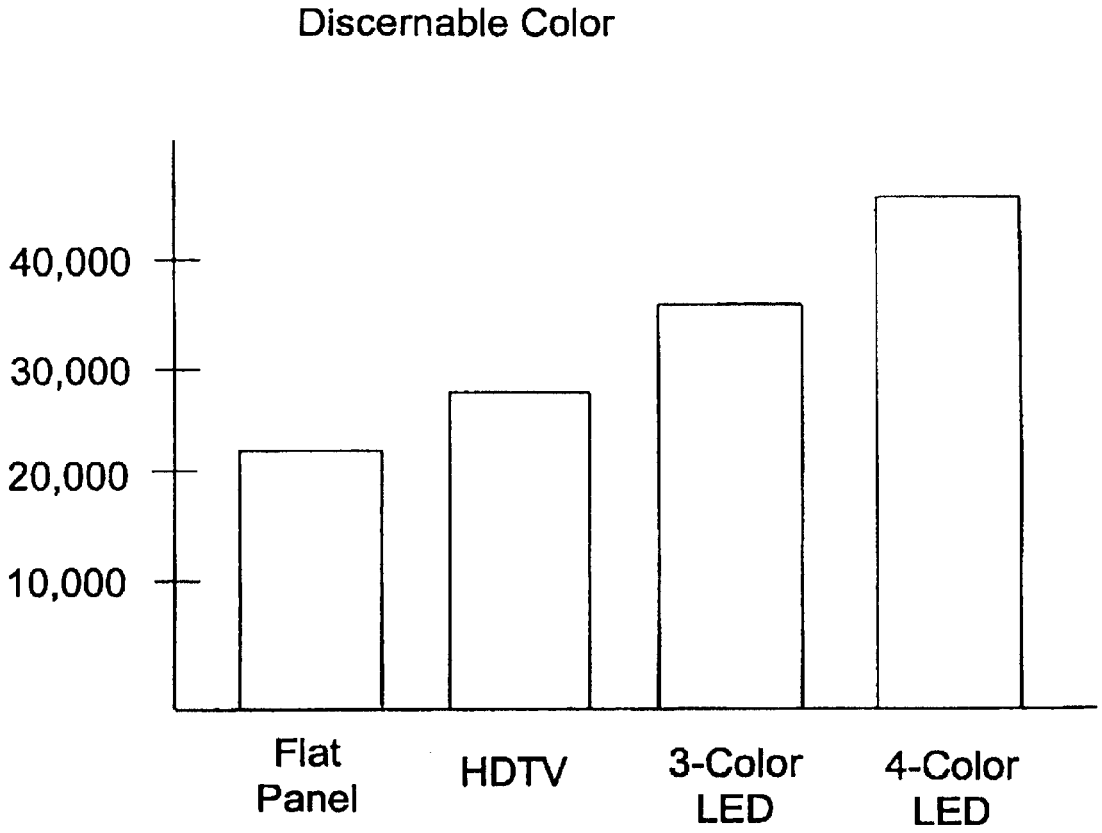
FIG. 4 is a chart depicting the improvement realized by an embodiment implementing a four-color LED display over other types of displays.

FIG. 4 is a graphical display of the improved performance in an exemplary four LED display system according to an embodiment of the invention. In this chart, the performance of the four color LED display summarized above is shown. The performance of a three color LED display without the second green LED is also shown. FIG. 4 shows a noticeable improvement of the four color LED display over the three color LED display. Moreover, FIG. 4 shows noticeable improvements over flat panels displays and high definition television. It has been observed that about 30% more colors are available in a four-color LED system as compared to a three-color LED system. Moreover, the use of a four-color LED system allows for optimization or minimization of selected factors such as LED power consumption or LED lifetime.

The use of multiple colors of LEDs to produce a perceived color is a control issue whereby an identified color within boundary 1102 has a unique coordinate as described by CIE standards. Thus, to reproduce a specified color becomes a mathematical issue of mixing different intensities of colors. Where only three colors are used, such as red LED 1106, first green LED 1108 and blue LED 210, there exists a unique combination of the three colors that produce a given color within boundary 1104. Where four colors are used, such as by the addition of second green LED 1112 according to the present invention, however, there may not be a unique combination of colors that produces a specified color within boundary 1114. In fact, usually many solutions exist to produce a given color. For example, in order to produce color 1120 the intensities of the four LEDs can be adjusted to produce color 1120. This is a first solution for color 1120. Note that because color 1120 is within triangular boundary 1104 produced by blue LED, red LED and first green LED, these three LEDs can be used to produce color 1120. This is a second solution for color 1120. Moreover, because color 1120 is also within triangular boundary 1124 produced by blue LED, red LED and second green LED, these three LEDs can be used to produce color 1120. This is a third solution for color 1120. In practices there are many more combinations available.

Algorithms based on known mathematical formulas are used to produce colors using a four or more color LED system. For example, see Gunter Wyszecki and W. S. Styles, Color Science: Concepts and Methods, Quantitative Data and Formula, Second Edition (New York: John Wiley and Sons, 1982), which is incorporated herein by reference. Because there can be many different solutions for producing a given color, the present invention applies conditions that produce desirable effects. In particular, the present invention seeks to control certain operating parameters to enhance the appearance of the image or the efficiency of the display. For example, in one embodiment of the invention, it is desirable to minimize the amount of power used by the LED display. It is well known in the art that LEDs of different types use different amounts of power. The difference in power usage is generally related to the wavelength of the light output and the semiconductor alloys used. For example, blue and red are of extremes of human perceptible colors and therefore use relatively more power to generate a perceived intensity. Compared to green which is near the middle of the range of human perceptible colors, less power is generally needed to produce the same perceived intensity as with red or blue LEDs. Moreover, red LEDs are typically made from arsenide alloys whereas blue and greens are produced using nitride alloys. In practice, it is observed that red LEDs use the most power followed by blue LEDs and then green LEDs. This observation is made at the time of the invention and is subject to change as new semiconductor materials are developed and as LED technology progresses.

In a four color LED pixel according to an embodiment of the invention, the inputs, such as those proportional to average current, are given by the vector x $$x = \begin{bmatrix} i_r \\ i_g \\ i_{g2} \\ i_b \end{bmatrix}$$

wherein $i_r$ corresponds to the input to red LED 1106, $i_g$ corresponds to the input to first green LED 1108, $i_{g2}$ corresponds to the input to second green LED 1112, and $i_b$ corresponds to the input to blue LED 1110.

The performance of a pixel can be expressed as a system of pixels. The system for the four-color LED displays is then given by array A $$A = \begin{bmatrix} X_1 & X_2 & X_3 & X_4 \\ Y_1 & Y_2 & Y_3 & Y_4 \\ Z_1 & Z_2 & Z_3 & Z_4 \end{bmatrix}$$

wherein $X_j$, $Y_j$ and $Z_j$ represent the CIE tristimulus values for the LEDs producing the j-th color. Then the vector result of the matrix-vector product Ax is the vector of tristimulus values of the light produced by the pixel containing the LEDs.

A desired color can be described by the vector of tristimulus values $$C = \begin{bmatrix} X_d \\ Y_d \\ Z_d \end{bmatrix}$$

Suppose that the error between two tristimulus vectors is given by the scalar-value function e(., .) where $e(a,b) \geqq 0$ with equality if, and only if, a=b. The error between the desired color and luminance and that obtained with input x is then e(c, Ax). Let S be the set of inputs that minimize the error, i.e., $S=\{x|x=\text{argmin } e(c,Ac)\}$. This will normally consist of only a single vector if the LEDs consist of only three colors. With four or more colors the set S will typically contain many possible inputs; then it will be possible to have some function (g(.) of the inputs that can be minimized to optimize the choice of input. Since the elements of the input vector are usually further constrained (e.g., to be non-negative) to a set T, the optimal choice for input is then the choice of x that minimizes g(x) subject to $x \epsilon S \cap T$, i.e., x minimizes both e(c,Ax) and g(x).

In an exemplary embodiment, g(x) is the current input to the LEDs. Moreover, power may be minimized for all inputs greater than zero. In another embodiment, g(x) is the power to the LED which is the product of the current and voltage applied to the LEDs. And, in yet another embodiment, g(x) is the operating time of an LED. By minimizing the operating time of an LED, the lifetime of that LED is maximized. Minimizing current or power input reduces the operating cost of a display as well as reduces the heat generated by the display. This minimization can be important for very large displays where tens of thousand to millions of individual LEDs are used. Where certain short lifetime LEDs are used, it is desirable to minimize the operating time of such LEDs thus reducing costs associated with replacing such LEDs. Other characteristics can be adjusted as desired by one of skill in the art.

In a preferred embodiment, the minimization of the present invention provides for operation using side conditions. For example, a parameter is minimized by operating identified LEDs at extremes of their operating range. In an embodiment of the invention, the extremes are lower extremes such as operating an identified LED at zero current. This can be understood by example.

LEDs of four colors are provided within each pixel, however, only three or less LEDs are used to generate a specified color. For example, assume that it is desirable to minimize the operating time of second green LED 1112 in order to maximize its life. Referring again to FIG. 11, quadrilateral boundary 1124 has vertices at red LED 1106, first green LED 1108, second green LED 1112 and blue LED 1110. Also, quadrilateral boundary 1124 is a composite of triangular boundary 1104 (with vertices at red LED 1106, first green LED 1108 and blue LED 1110) and triangular boundary 1126 (with vertices at first green LED 1108, second green LED 1112 and blue LED 1110). Minimization of the operating time of second green LED 1112 becomes an application of threshold conditions.

Figure 12:
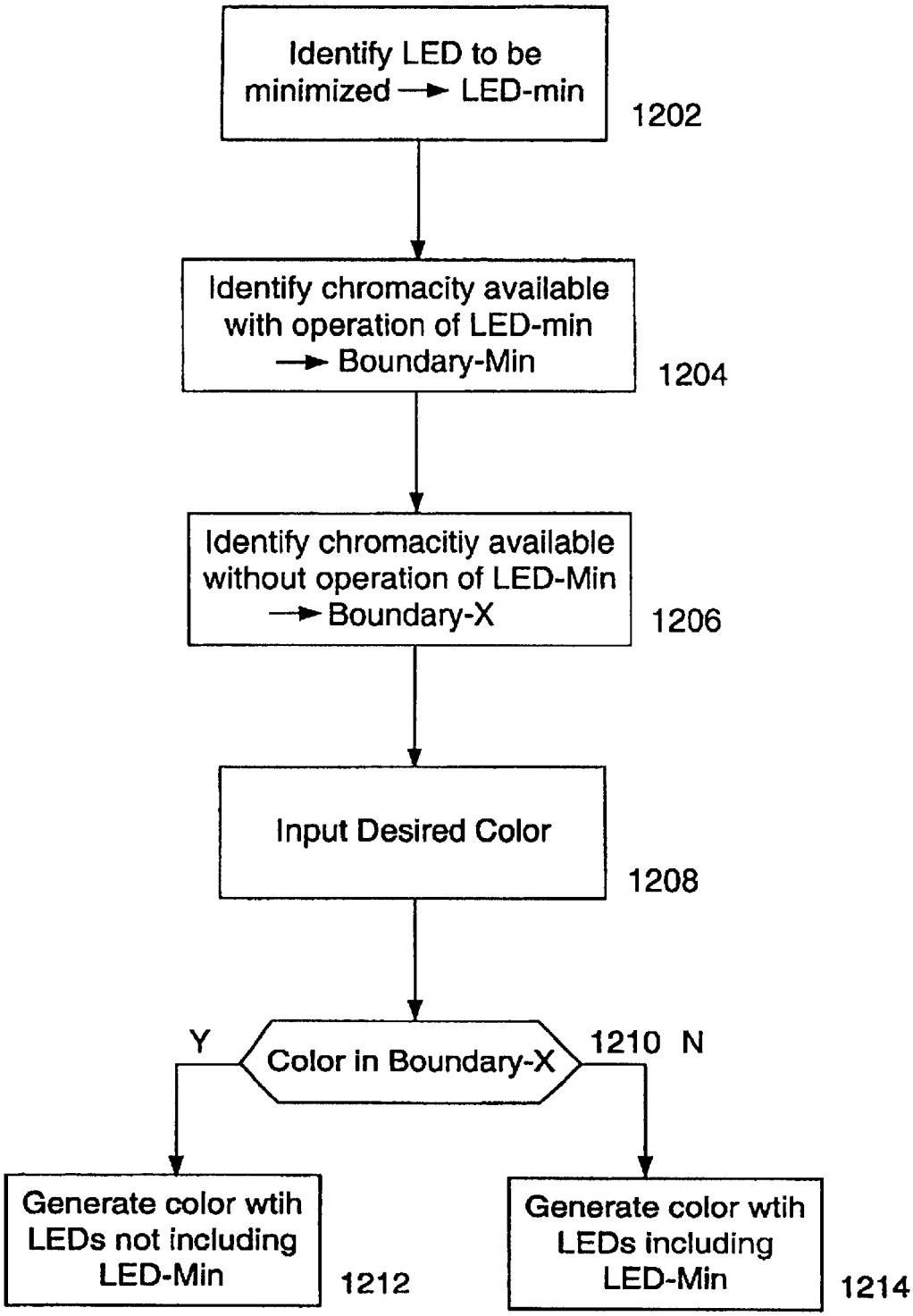
FIG. 12 is a flowchart of a method for minimizing a parameter of an LED according to an embodiment of the invention.

FIG. 12 is a flowchart of a method for minimization according to the present invention. The method of FIG. 12 is a minimization achieved with side conditions according to an embodiment of the invention and applicable to minimization of operating time as well as power and current. At step 1202, an LED, LED-min, is identified for which operating time is to be minimized. At step 1204, a region of chromacity with boundary, Boundary-Min, is identified. In minimizing the operating time of LED-min, the region encompassed by Boundary-Min is minimized. At step 1206, a region of chromacity with boundary, Boundary-X, is identified. In this manner, the composite boundary. Boundary-Tot, created by Boundary-Min plus Boundary-X produces the color gamut of the embodiment being describe. At step 1208, a desired color is input. Step 1210 is then a threshold operation to check whether the desired color is within Boundary-X. The desired color will lie within Boundary-X if it can be generated without use of LED-min. If this condition is met, the desired color is generated at step 1212 without use of LED-min. However, if the desired color does not lie within Boundary-X, the desired color is generated at step 1214 through the use of LED-min.

The method of FIG. 12 is maybe implemented in software byone of skill in the art. In another embodiment, certain steps of FIG. 12 can be implemented in hardware. For example, boundary data may be stored in random access memory (RAM). The method of FIG. 12 is also applicable to current, power and other parameters as will be known to those of skill in art. The method of FIG. 12 can be supplemented within a verification operation that would verify that the desired color lie within the composite boundary.

LED display 102 of FIG. 1 must also operate over a wide range of ambient light. Where LED display is used indoors, it must operate at different levels of lighting. Moreover, where LED display 102 is used outdoors, it must operate in direct sunlight, in scattered light from fog, or on a dark moonless night. Thus, LED display 102 preferably operates over a wide range of luminance. In a preferred embodiment of the invention, display system 100 operates in this wide range, from bright to very dark, using steps in luminance. Preferably, the steps in luminance are closely related to human perceived just-noticeable differences in luminance. Thus, the difference in pixel luminance between adjacent steps is below the level that is just noticeable by human perception. In this manner, undesirable artifacts are not introduced into LED display 102.

The present invention accommodates a wide range of luminance that is necessary to display images in bright daylight as well as moonless nights. This can be accomplished according to the invention by choosing the levels of the dynamic range of LED display 102 in a non-linear manner and implementing these non-linearities in LED control electronics. In this way, the present invention avoids noticeable artifacts in images with large areas of nearly constant brightness.

Figure 5:
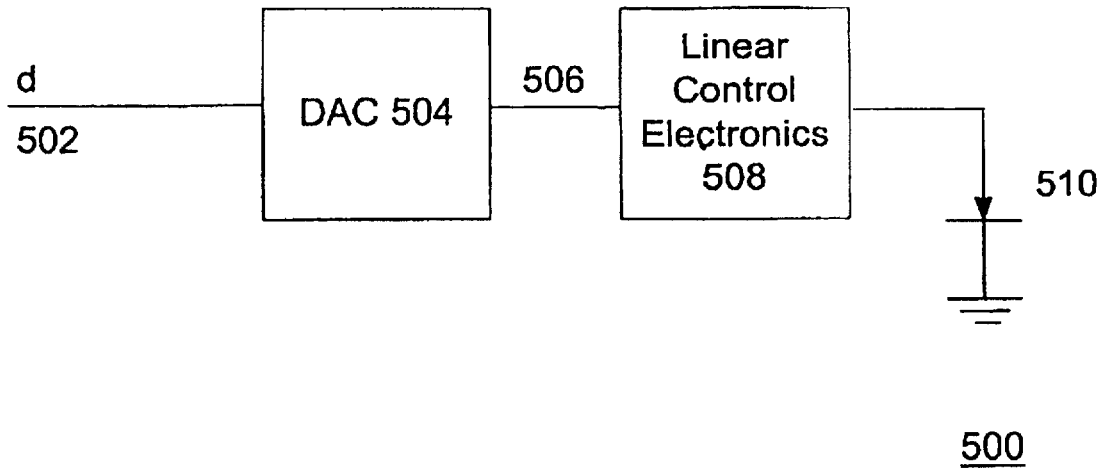
FIG. 5 is a block diagram of linear control electronics for driving an LED according to the prior art.

To understand this aspect of the present invention, it is first necessary to understand the problem. FIG. 5 is a simplified representation of the control electronics of an LED display. A digital control signal, d, at input 502 is directed to a digital to analog converter (DAC) 504. In a typical implementation, an 8-bit DAC 504 produces 256 different levels at DAC output 506 which is then input into linear control electronics 508. Linear control electronics 506 then drives LED 510. Implementation of DAC 504 with linear control electronics 506 then produces even increments of luminance at LED display 102. However, evenly distributed increments of luminance may produce some noticeable and undesirable artifacts, such as contouring within certain ranges of luminance.

Figure 6:
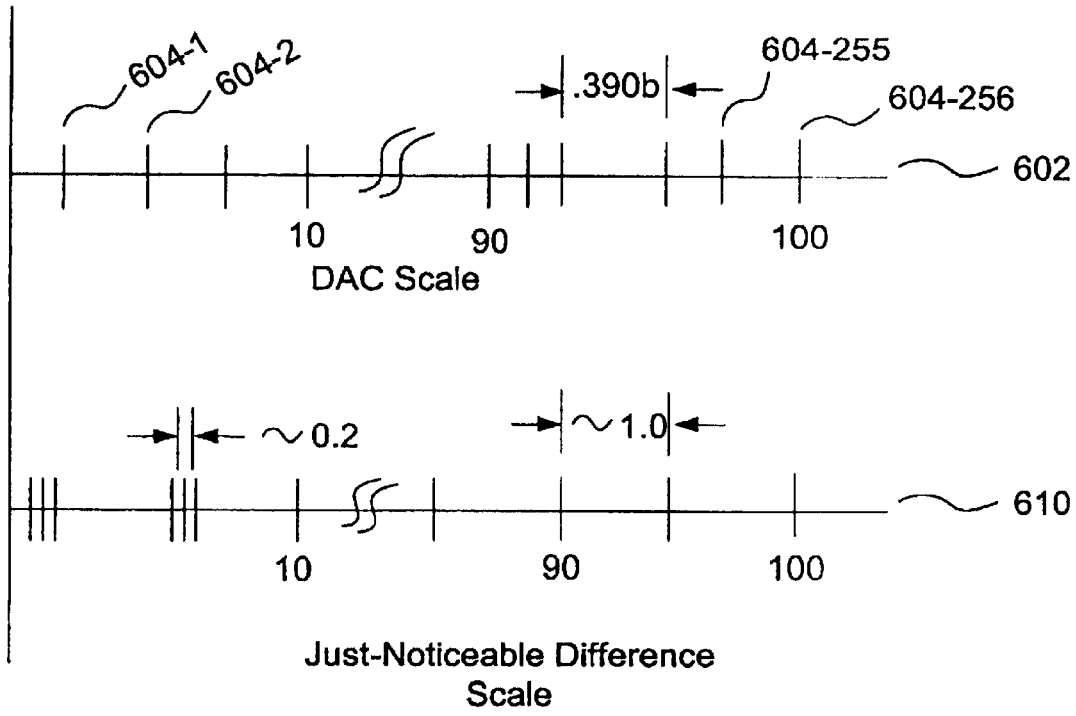
FIG. 6 includes a scales depicting the increments of luminous intensity using a linear implementation of an 8-bit DAC and a scale depicting the just noticeable differences of luminous intensity as perceived by humans.

FIG. 6 shows a linear scale 602 with increments 604-1 through 604-256 which are evenly distributed in the range from 0 lumens to 100 lumens in this example. Increments 604-1 through 604-256 have increments of 0.3906 lumens when an 8-bit DAC 504 is used. FIG. 6 also shows a just-noticeable difference scale 610 which is a representation of the increments of human perceived just-noticeable differences in luminance, which characteristically have unevenly distributed increments. For each increment of scale 610, an average person would just perceive a difference in light intensity.

Of particular interest in scale 610 are the widely spaced increments of high intensities approximately greater than 90 luminance and the contrastingly closely spaced increments for low intensities approximately less than 10 lumens. In comparing the increments on scale 602 at high intensity over 90 lumens to the increments on scale 610, the increments on scale 602 of 0.3906 lumens per increment are observed to be smaller than the just-noticeable increments for the same range of intensities on scale 610 which are about 1 lumen per increment. The result being that for a high intensity, the evenly distributed scale producers increments in intensity that are not noticeable by human perception. This is a desirable result.

Contrastingly, in comparing the increments on scale 602 at low intensities below 10 lumens to the increments on scale 610, the increments on scale 602 at 0.3092 lumens per increments are observed to be larger than the just-noticeable increments for the same range of intensities on scale 610 which are about 0.2 lumens per increment. The result here for low intensities is that the evenly distributed scale produces increments in intensity that are undesirably noticeable by human perception. The prior art systems would not work properly producing an undesirable contouring effect. It is important to note that scale 610 is shown as an example. In practice, scale 610 varies for different colors of LEDs. For example, a just-noticeable difference scale would be different for red, blue and green LEDs.

Figure 13A:
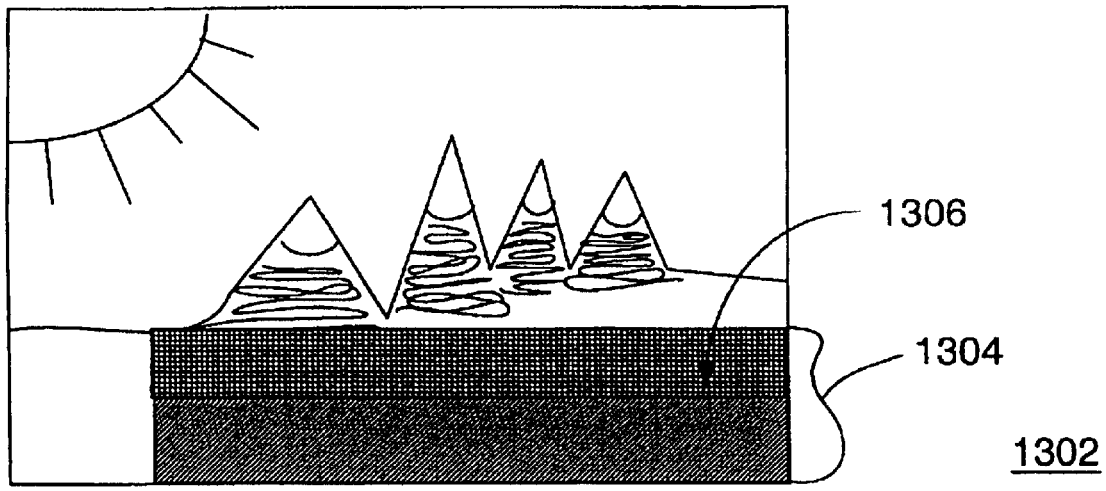
FIG. 13A is an image containing undesirable artifacts including contouring.

It can, therefore, be understood that to have evenly distributed increments in luminance from very low to very high luminance can produce human perceived noticeable differences at low luminance. This perceived noticeable differences are especially noticeable for large areas of low luminance to produce what is called contouring. The undesirable effect of contouring as addressed by the present invention can be understood with reference to an example. FIG. 13A represents an image 1302 with a wide range of luminance and further has a large area 1304 of almost constant brightness. In area 1304, however, there are subtle changes in brightness that cannot be correctly represented. It is only when the difference in brightness exceeds a certain level that a range of pixels is displayed at a different intensity. This produces the undesirable effect of contouring. Contouring produces a noticeable line such as line 1306 where a range of equal intensity transitions to another range of noticeably different intensity. The present invention solves this problem.

Figure 13B:
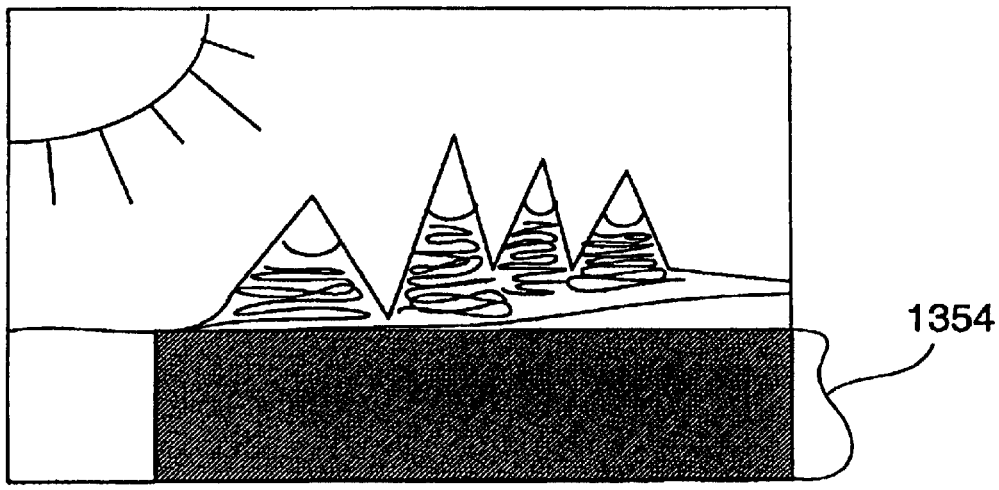
FIG. 13B is an image that eliminates undesirable artifacts including contouring according to an embodiment of the invention.

FIG. 13B represents an image 1352 with a wide range of luminance which also has a large area 1354 of almost constant-brightness. As with area 1304, area 1354 has subtle changes in brightness. Image 1352, in contrast to image 1302, is displayed with smaller increments of intensity for low intensities. Thus, there is no noticeable contouring effect in image 1354 and no lines similar to line 1306 are present.

Figure 7:
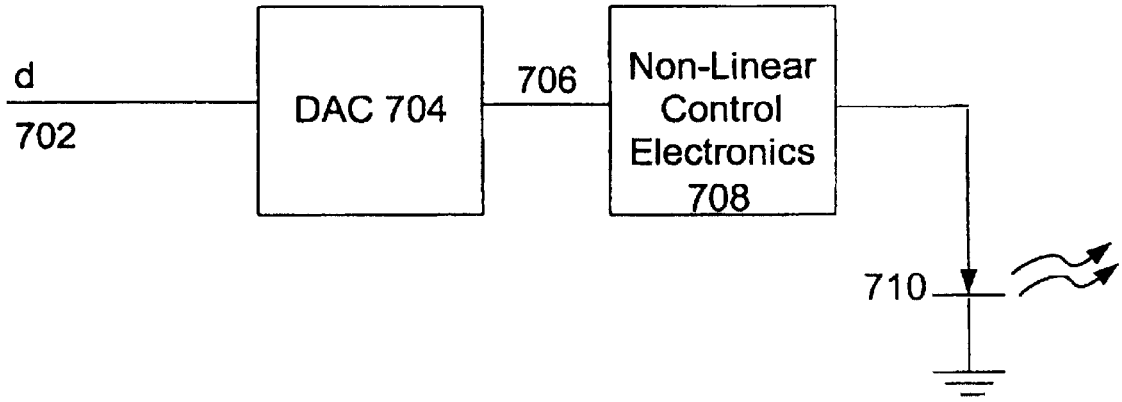
FIG. 7 is a block diagram of non-linear control electronics driving an LED according to an embodiment of the present invention.

Thus, in one embodiment of the present invention, such a contouring problem is resolved by implementing a non-linear control function as part of the LED control circuitry. FIG. 7 is a simplified representation of a non-linear control electronics of an LED display according to the invention. A digital control signal, d, at input 702 is directed to a digital to analog converter (DAC) 704. In an typical implementation, an 8-bit DAC 704 produces 256 different levels at DAC output 706 which is then input into non-linear control electronics 708. Non-linear control electronics 706 then drives LED 710.

Figure 8A:
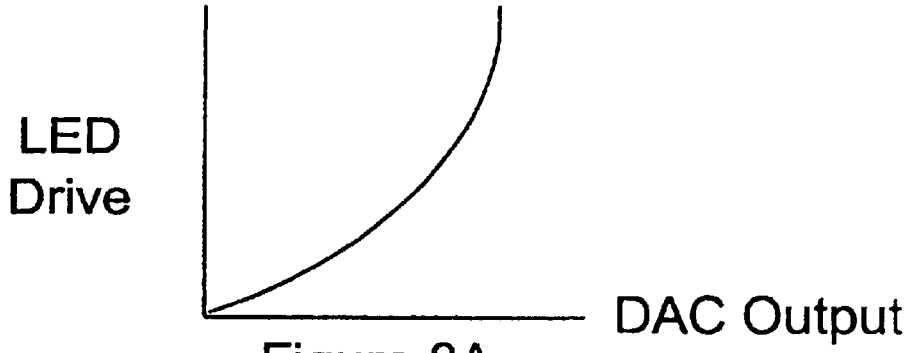
FIGS. 8A–E illustrate various non-linear functions that can be implemented in the non-linear control electronics according to embodiments of the invention.
Figure 8B:
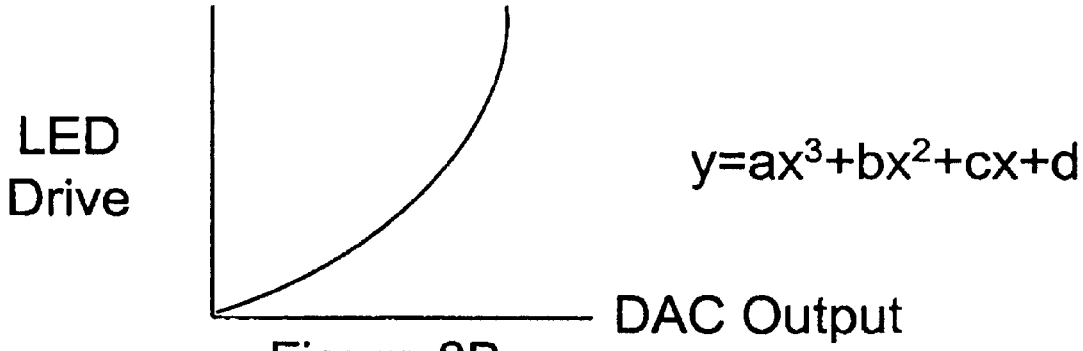
Figure 8C:
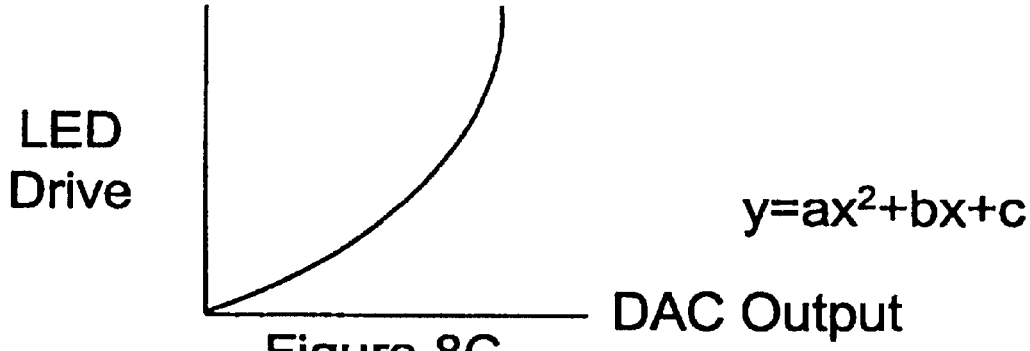
Figure 8D:
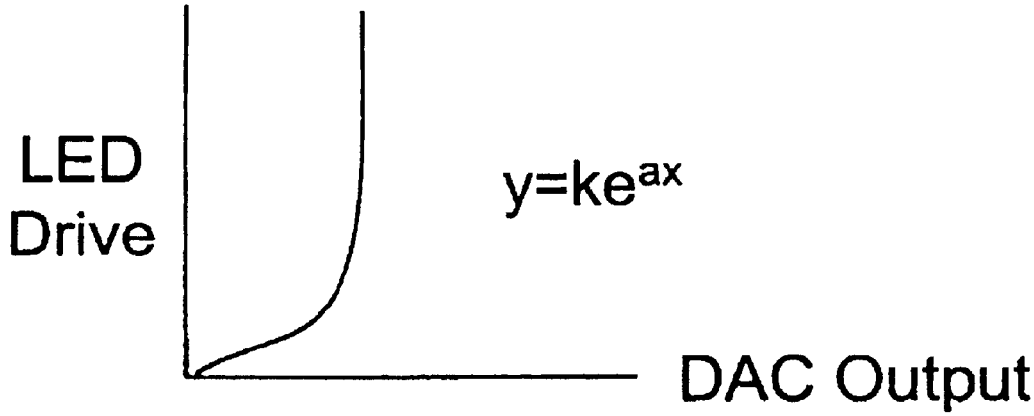

In an embodiment of the invention, non-linear control electronics 706 is implemented to closely match the non-linear characteristic of just-noticeable difference scale 610 for any a desired chromacity. Such non-linear control electronics 706 would then have a characteristic given by a function, f(x), as shown in FIG. 8A. Using curve fitting methods known in the art, a third order function, $y=ax^3+bx^2+cx+d$, as shown in FIG. 8B is used to approximate the non-linear characteristic of scale 610 according to another embodiment of the invention. Such curve fitting techniques can also be used to generate a quadratic function, $y=ax^2+bx+c$, as shown in FIG. 8C. In yet another embodiment of the invention, an exponential function, $y=ke^{ax}$, as shown in FIG. 8D is used to approximate the non-linear characteristic of scale 610.

Figure 8E:
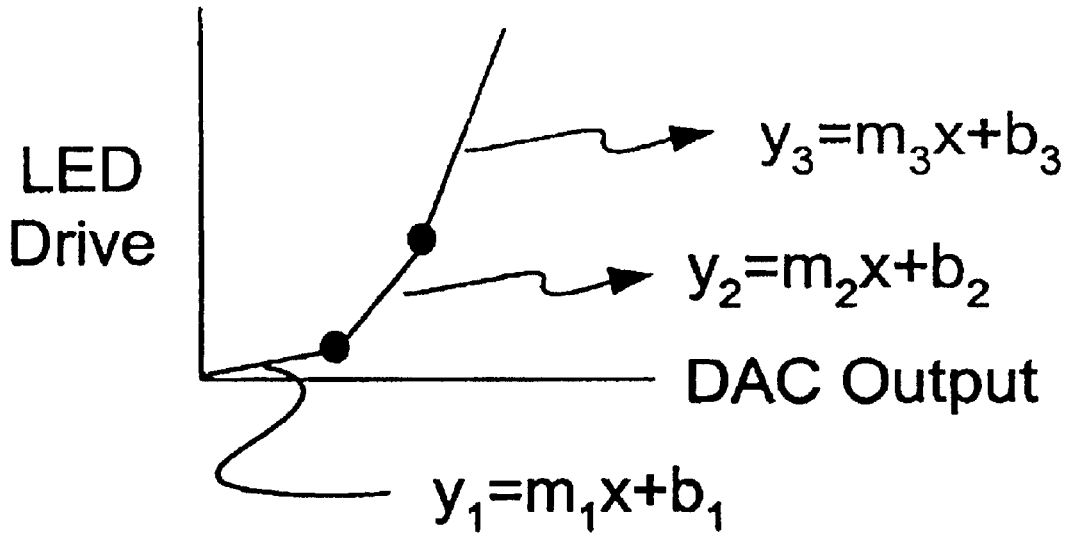

The non-linear characteristic of scale 610 is implemented in another embodiment using several piece-wise linear functions, $y_1=m_1x+b_11$, $y_2=x+b_21$, and $y_3=m_3x+b_11$, as shown in FIG. 8E. FIG. 8E shows a representative of a piece wise linear control function using three different linear functions to approximate the non-linear function of scale 610. The three ranges of the piece-wise linear function of FIG. 8E are then implemented using switching techniques for varying levels of intensities. Using more piece-wise linear functions would provide even more improvement.

Figure 8F:
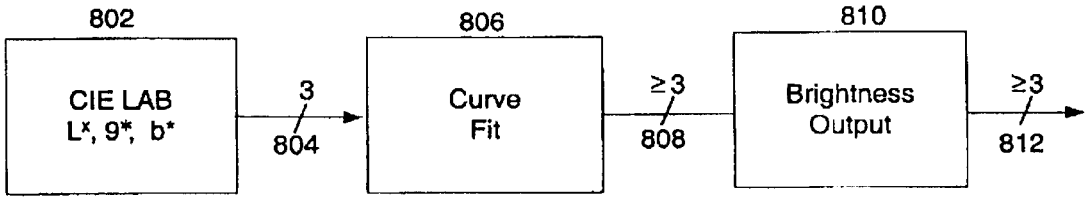
FIG. 8F is a block diagram of non-linear control electronics according to an exemplary embodiment of the invention.

The block diagram shown in FIG. 8F represents an implementation of non-linear control electronics implementing non-linear characteristics as shown in FIGS. 8A–E. At block 802, the various CIE components are determined for a particular color which provides CIE inputs 804 to curve fit block 806. As shown, CIE LAB is used such that three inputs 804 are provided to curve fit block 806. Where a different standard is used more inputs may be necessary. It is curve fit block 806 that implements non-linear characteristics such as those shown in FIGS. 8A–E. Moreover, curve fit block 806 is preferably implemented in software such that changes can easily be made. Hardware implementations can be more limiting, but can nonetheless be implemented. Upon fitting a certain color to a non-linear characteristic, curve fit block 806 provides non-linear inputs 808 to brightness output block 810. As a result of the processing of curve fit block 806 at least three non-linear inputs 808 are provided. It is brightness output block that provides LED inputs 812 to a given pixel. The concept of FIG. 8F is therefore extended to the many pixels of an LED display.

Among other implementations, LED display 102, as shown in FIG. 1, may be implemented as a standing signboard to display advertisements to the general public. Moreover, LED display may be implemented as a large video display for displaying moving images. Accordingly, LED display is appropriate for displaying images related to television or print media. In many implementations, however, the interaction of at least two particles is required to display a high quality image on LED display 102. Moreover, there must be a efficient and effective transfer from a creator of original artwork to LED display 102. An image transfer interface according to an embodiment of the invention assures that original artwork generated in other media is properly displayed on LED display 102.

Television and print media are characterized by nonlinear luminance characteristics. Television outputs its images onto a cathode ray tube ("CRT") which has an output luminance that is not directly proportional to the applied electrical drive. The non-linearity is further aggravated by the use of a non-linear mapping of the CRT output to limit the dynamic range needed in studio equipment. Print media, on the other hand, must deal with reflected luminance that is not directly proportional to the amount of ink per unit area.

LEDs, however, have the advantages that their luminance characteristics can be applied linearly without need for a gamma transformation. Hence, it is desirable that the signals sent to drive LED display 102 have a representation that is linear in luminance for each color in each pixel. The present invention takes advantages of this linearity for each color in each pixel of the LED display 102. Advantageously, the present invention provides the additional benefit that other operations such as the accommodation of reflected sunlight from the surface of LED display 102 can be done directly without need to transfer to a linear luminance representation. Moreover, in the present invention, chromacity is represented for each pixel individually.

Whereas many chromacity representations are available, adherence to a standard facilitates image transfer. With ever increasing computational power, adherence to the CIE standard has become easily realizable. In this way chromacity is characterized in a widely understood digital format. Advantageously, the representation of color and luminance of each pixel as digital data allows the direct transfer via a communications network such as the Internet or other private digital network in an embodiment of the invention. Adherence to the CIE standard provides advantages and reduces confusion at the display interface sometimes associated with image transfer in the prior art.

In one preferred embodiment, the present invention complies with standards of the CIE and the International Color Consortium ("ICC") for the Color Management Framework. Thus, either CIEXYZ or CEELAB can be used. Gunter Wyszecki and W. S. Styles provide background on color and the CIE standards in their book Color Science: Concepts and Methods Quantitative Data and Formulae, Second Edition (New York: John Wiley & Sons, 1992). Such book is herein incorporated by reference as background.

The CIELAB standard provides certain advantages because it can be used within a TIFF framework whereas the CIEXYZ is not part of the TIFF standard. Conversions between CIELAB and CIEXYZ, however, are provided in Wyszecki and Styles. Accordingly, either CIELAB or CIEXYZ are used in different embodiments of the invention.

Importantly, all data processing, including anti-aliasing and color tansformations, must be performed before an image is encoded into the TIFF-CIELAB format. In an embodiment of the invention, these tasks are performed by creators of original artwork. In implementing this the TIFF-CIELAB format, the tasks to be performed by the operator of LED display 102 are reduced to mapping the received image into the gamut of the LED display and setting the overall image brightness level. Prior to displaying the image, the operator of the LED calibrates LED display 102.

Figure 3:
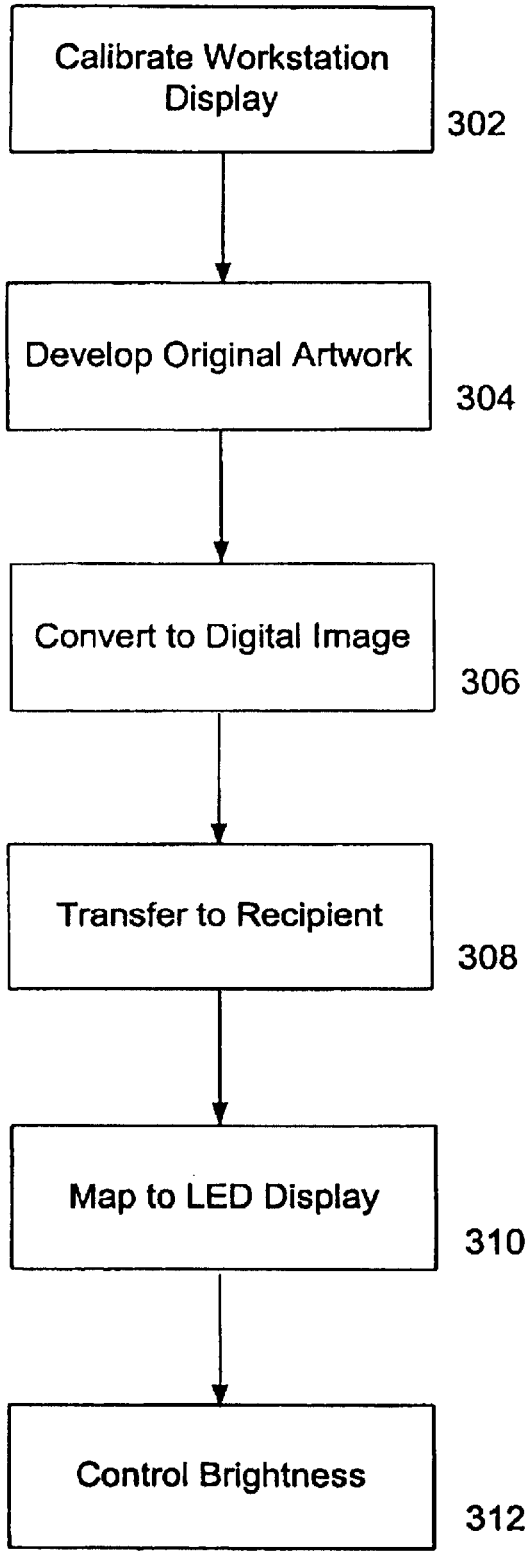
FIG. 3 is a flowchart for image quality control according to an embodiment of the invention.

FIG. 3 summarizes a process for the management of image transfer implemented in an embodiment of the invention. At step 302, a workstation display is calibrated to conform with an identified standard such as CIELAB. This image workstation is used by creators of original artwork to be displayed on LED display 102. Step 302 can typically be accomplished through hardware or software that performs a digital transformation to calibrated CRT or other display media. In the present invention, an entity such as an advertising agency develops original network at step 304 using the workstation calibrated at step 302. The present invention provides advantages over the prior art because displays are not typically calibrated and standardized such that upon transfer to a display medium, undesirable characteristics are sometimes visible on the final display medium, but were not visible on the display media upon which the original network was created. These undesirable characteristics can lead to unsatisfied customers.

Having developed original artwork, the creator then digitally represents the image at step 306 in compliance with a standardized manner. In an embodiment of the invention, the CIELAB standard is used in compliance with the TIFF framework. Part of step 306 includes performing anti-aliasing and color transformation tasks. Implementing anti-aliasing techniques is important to avoid jagged edges. Jagged edges can be created because the light from the pixels is not continuous over the surface of LED display 102. In LED display 102 the light is concentrated at the LEDs with a non-illuminating surface surrounding it. Thus, without implementing anti-aliasing techniques lines may appear jagged if the line is not aligned with the rows or columns of the pixels. Solutions to this problem are well known in the art and can be achieved in software.

At step 308, the digitized image is then transferred to a recipient such as the operator of LED display 102. Because the image is digitized, the image transfer can be accomplished through the use of a digital network such as wide area network 108 including the Internet or other private network such as ATM. In an embodiment of the invention, image workstation 104 serves as the recipient of the digital data. At step 310, the image is then mapped into the gamut of LED display 102. Step 310 is executed by either image workstation 104, display PC 110 or support computing and storage 116 of FIG. 1. To optimize viewing of the LED display, the image brightness level is controlled at step 312. This step can be executed efficiently by display PC 110.

By implementing the method of FIG. 3, the quality of the images displayed on the LED display can be closely controlled for quality. The method of the present invention provides an efficient scheme for accountability of the critical tasks necessary toward achieving a high quality image at LED display 102. Because at least one party is involved in developing original artwork and a separate party is involved in displaying the image on LED display 102, the party operating LED display 102 cannot guarantee strict calibration and compliance by the developer of the image. He can, however, guarantee his compliance with steps 310–312. Similarly, a party developing original network cannot guarantee the other party's compliance; the party developing original artwork can, however, guarantee compliance with steps 302–308. In this way, overall quality control is achieved and liability for defective images is readily isolated.

Advantageously for the party operating LED display 102, tasks are reduced to only steps 310 and 312 and do not involve any judgments on chromacity. Chromacity is strictly in the hands of the party developing the image. When implementing the method of FIG. 3, errors are often isolated to incorrectly calibrated CRTs or loose compliance with the display standard. Because the party developing original artwork has the largest stake in a high quality image shown on LED display 102, he will be highly motivated to meticulously comply with steps 302–308. In complying with steps 302–308, the creator of original artwork should routinely maintain all the transfer functions from the original artwork to the color standard in use. Calibrations of display media should be made in a scheduled manner and up to date transfer functions should always be used. Similarly, transfer functions from the color standard in use to all output devices should be properly documented and controlled. Moreover, the transfer function should be routinely determined and stored for all operations. For example, up to date and correct transfer functions should be maintained for all CRTs in use, hard copy printouts and LED display 102 of the present invention.

Several operating procedures are designed to reduce the risk of either faulty operation of the sign or its failure to operate. Camera 114, which can be operated autonomously, monitors LED display 102 and provides failure or fault signals upon improper operation of LED display 102. In an embodiment, a feedback control system implemented at display PC 110 reduces improper operation as described above. In another embodiment, camera 114 provides failure or fault signals to image workstation 104 through the described communications link of FIG. 1. Other signals available to both display PC 110 and image workstation 104 include internal operating temperatures and power system parameters.

In a preferred embodiment, display PC 110 executes a program that interprets dispatch tables, sometimes called "play lists," and places the scheduled images on LED display 102. As part of a fault tolerance scheme, display PC 110 contains a default play list that allows the sign to operate for extended periods of time without communication with image workstation 104. Such a default play list is desirable so as to limit the impact of a failure of the communications link between image workstations 104 and display PC 110.

Figure 2:
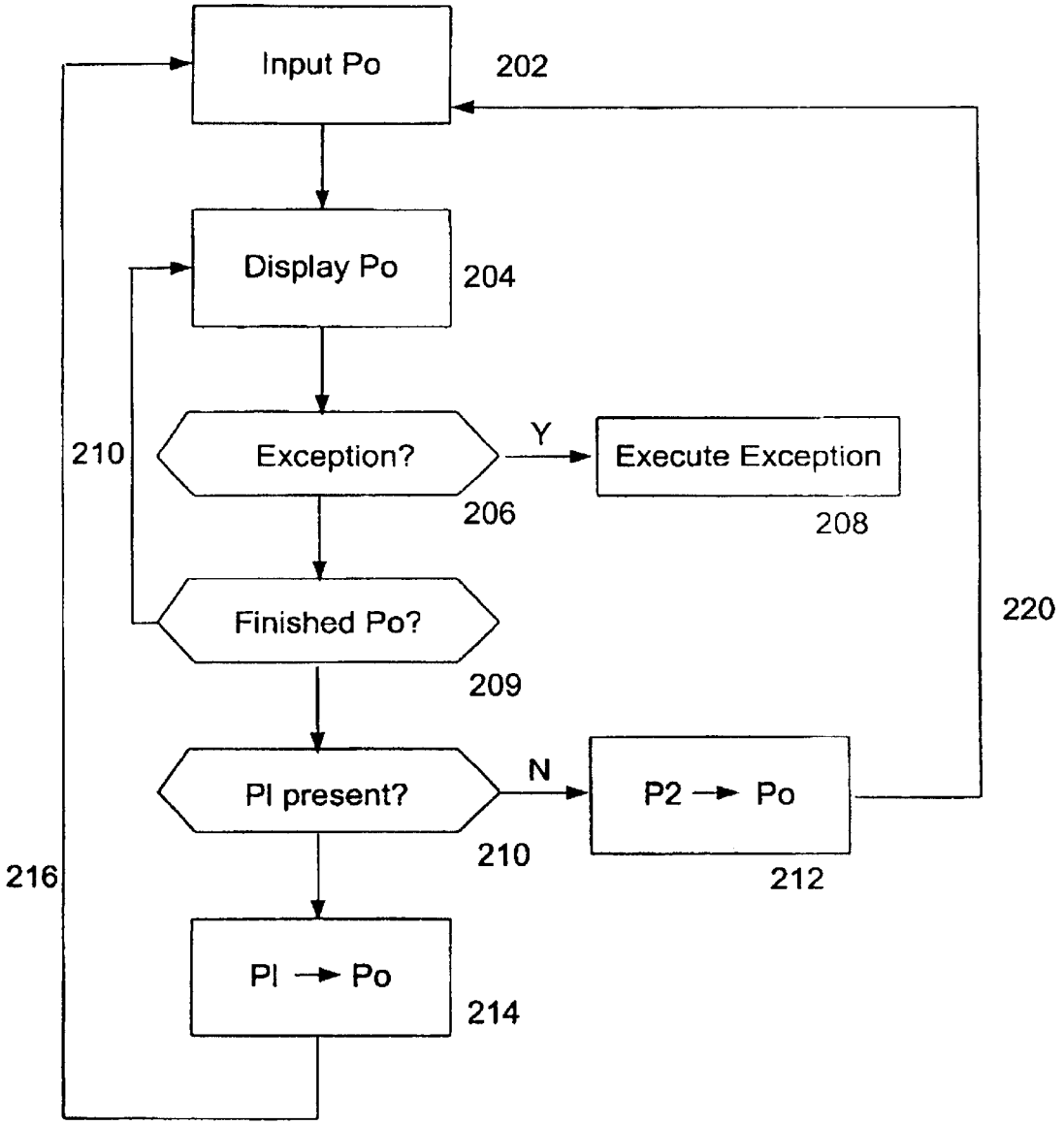
FIG. 2 is a flowchart for implementing a fault tolerate method according to an embodiment of the invention.

FIG. 2 is a flowchart of a fault tolerance implementation. In step 202 an initial image P0 is input into display system 100. At step 204, the image P0 is displayed on LED display 102. At step 206, the algorithm checks for the occurrence of an exception. If an execution exists, the exception service is executed as shown in step 208. An example of an exception is a command to abort the current play list to install another desired play list. If no exception exists, the algorithm at step 209 then checks whether the display system 100 is finished displaying image P0. If not, loop 210 is executed and image P0 continues to be displayed. Upon image P0 being displayed for its allotted time, step 212 is executed to check whether the next image P1 is present.

P1 is present upon the proper operation of display system 100. In a remotely operated system such as that shown in FIG. 1, image workstation 104 transfers the image P1 to display PC 110. When the communication link between image workstation 104 and display PC 110 is working properly, P1 will be present at step 212. Then, at step 214, image P1 is copied into P0 and loop 216 reinitiates execution of step 202.

Where the communication link between the image workstation 104 and display PC 110 is not working properly, image P1 may not exist. Other undesirable situations can also prevent the availability of image P1. In such situations, step 218 is executed to copy the contents of a default image, P2, into image P0. Loop 220 then reinitiates step 202. In an embodiment of the invention, subsequent unavailability of P1 at step 212 will iteratively copy different images P2 into P0 at step 218. in this embodiment, P2 is actually a set of images {P2a, P2b, . . . }.

The present invention solves the control issues arising out of four color creation and further adds important features including increased color gamut, improved luminance dynamic range and realization, improved feedback control of image quality and improved image quality control. As this invention may be embodied in several forms without departing from the spirit of essential characteristics, the present embodiments are therefore illustrative and not restrictive. The scope of the invention is defined by the appended claims rather than by the description preceding them. All changes that fall within the meets and bounds of the claims, or equivalence of such meets and bounds are therefore intended to be embraced by the claims.

What is claimed is:

1. A method for displaying an image on a light-emitting diode display, the display having a first set of light-emitting diodes capable of emitting light having a first set of at least four chromaticities, method comprising:

identifying at least a first light-emitting diode from said first set capable of emitting light having at least one chromaticity for which an operating parameter is to be minimized;

identifying a first region of chromaticity with a boundary available through operation of said at least one light-emitting diode and a first subset of said first set of light emitting diodes capable of emitting light having a first subset of chromaticities;

identifying a second region of chromaticity with a second boundary available through operation of a second subset of light emitting diodes capable of emitting light having a second subset of chromaticities;

specifying a desired color;

determining whether the desired color resides within the second boundary;

generating the desired color using the second set of light-emitting diodes if the desired color resides within the second boundary, thereby minimizing said operating parameter; and generating the desired color using said at least one light-emitting diode and the second set of light-emitting diodes if the desired color does not reside within the second boundary.

2. The method of claim 1, wherein the operating parameter to be minimized is power.

3. The method of claim 1, wherein the operating parameter to be minimized is current.

4. The method of claim 1, wherein the operating parameter to be minimized is operating time.

5. The method of claim 1, further comprising the step of verifying that the desired color resides within the first boundary.

6. The method of claim 1, further comprising the step of verifying that the desired color resides within the first boundary or the second boundary.

7. A light-emitting diode display comprising:

a plurality of pixels arranged in a plurality of rows and columns to display a predetermined image, the plurality of pixels composed of a first set of light-emitting diodes capable of emitting light having a first set of at least four chromaticities;

digital input circuitry to input a digital signal for a desired color and a desired luminance;

a digital-to-analog converter capable of converting the digital signal to an analog signal, the digital-to-analog converter having a dynamic range;

control electronics capable of driving the plurality of pixels; and a threshold operator capable of determining whether the desired color is within a first region of chromaticity with a first boundary available through operation of at least one light-emitting diode capable of emitting light having a first chromaticity and a first subset of said first set of light emitting diodes capable of emitting light having a first subset of chromaticities, wherein the first subset of light emitting diodes is less than or equal in number to the first set;

the threshold operator further capable of determining whether the desired color is within a second region of chromaticity with a second boundary available through operation of second subset of the first set of light emitting diodes having a second subset of chromaticities, the second subset not including the first light-emitting diode and, wherein the second subset of light-emitting diodes is less than or equal to the first set.

8. The light-emitting diode display of claim 7, wherein the desired color is within the first region of chromacity and the control electronics drives the at least one light-emitting diode and the second set of light-emitting diodes to generate the desired color.

9. The light-emitting diode display of claim 7, wherein the desired color is within the second region of chromacity and the control electronics drives the third set of light-emitting diodes to generate the desired color.

10. The light-emitting diode display of claim 7, wherein the control electronics implements a non-linear control function.

11. The light-emitting diode display of claim 9, wherein the control electronics implements a polynomial function.

12. The light-emitting diode display of claim 9, wherein the control electronics implements a piece-wise linear function.

13. The light-emitting diode display of claim 9, wherein the control electronics implements a control function closely matching human perceptible just-noticeable difference in intensity.

14. The light-emitting diode display of claim 7, wherein the parameter is power.

15. The light-emitting diode display of claim 7, wherein the parameter is current.

16. The light-emitting diode display of claim 7, wherein the parameter is operating time.

17. A light-emitting diode display system comprising:

a first set of light-emitting diodes capable of emitting light having a first set of chromacities, the first set of chromacities being equal to or greater than four;

a first memory device for storing digital information;

a first computer processor capable of executing the steps of identifying at least one light-emitting diode capable of emitting light having a at least one chromacity from within the first set of diodes for which a parameter is to be minimized;

identifying a first region of chromacity with a first boundary available through operation of the at least one light-emitting diode and a second set of light emitting diodes capable of emitting light having a second set of chromacities, wherein the second set of light emitting diodes is less than or equal to the first set;

identifying a second region of chromacity with a second boundary available through operation of a third set of light emitting diodes capable of emitting light having a third set of chromacities, the third set not including the first light-emitting diode and, wherein the third set of light-emitting diodes is less than or equal to the first set;

specifying a desired color;

determining whether the desired color resides within the second boundary;

if the desired color resides within the second boundary, generating the desired color using the third set of light-emitting diodes; and if the desired color does not reside within the second boundary, generating the desired color using the at least one light-emitting diode and the second set of light-emitting diodes.

18. The system of claim 17, wherein the parameter to be minimized is power.

19. The system of claim 17, wherein the parameter to be minimized is current.

20. The system of claim 17, wherein the parameter to be minimized is operating time.

21. The system of claim 17, wherein the first computer processor is further capable of executing the step of verifying that the desired color resides within the first boundary.

22. The system of claim 17, wherein the first computer processor is further capable of executing the step of verifying that the desired color resides within the first boundary or the second boundary.

23. The system of claim 17, wherein a second computer processor is capable of sharing the executing the steps of identifying at least one light-emitting diode capable of emitting light having a at least one chromacity from within the first set of diodes for which a parameter is to be minimized;

identifying a first region of chromacity with a first boundary available through operation of the at least one light-emitting diode and a second set of light emitting diodes capable of emitting light having a second set of chromacities, wherein the second set of light emitting diodes is less than or equal to the first set;

identifying a second region of chromacity with a second boundary available through operation of a third set of light emitting diodes capable of emitting light having a third set of chromacities, the third set not including the first light-emitting diode and, wherein the third set of light-emitting diodes is less than or equal to the first set;

specifying a desired color;

determining whether the desired color resides within the second boundary;

if the desired color resides within the second boundary, generating the desired color using the third set of light-emitting diodes; and if the desired color does not reside within the second boundary, generating the desired color using the at least one light-emitting diode and the second set of light-emitting diodes.

*24. An electronic billboard system comprising:*

*an electronic display;*

*a communication interface to a wide area network;*

*a feedback control system having one or more sensors sensitive to the image displayed on the electronic display and the environment to provide output signals indicative of a quality parameter of pixels in the electronic display; and*

*a controller for (1) controlling displaying an image of the electronic display; (2) communicating over the communication interface to receive the image for display on the electronic display; and (3) adjusting the image on the electronic display by varying the intensity of individual colors of the pixels in accordance with a prescribed intensity scale for each color and the output signals from the feedback control system.*

*25. An electronic billboard system as in claim 24, wherein the electronic display comprises a light-emitting diode display.*

*26. An electronic billboard system as in claim 24, wherein the quality parameter of the electronic display comprises brightness.*

*27. An electronic billboard system as in claim 26, wherein the brightness spans a dynamic range between 1:1 to 2000:1.*

*28. An electronic billboard system as in claim 27, wherein the feedback control system comprises a camera.*

*29. An electronic billboard system as in claim 24, wherein the feedback control system detects the light pattern of the electronic display.*

*30. An electronic billboard system as in claim 28, wherein the output signals represent a digital representation of a distribution of the brightness.*

*31. An electronic billboard system as in claim 24, wherein the sensors detect a color pattern of the electronic display.*

*32. An electronic billboard system as in claim 31, wherein the output signals represent a digital representation of a distribution of the colors on the electronic display.*

*33. An electronic billboard system as in claim 24, wherein the output signals are provided over the wide area network to a remote computer.*

*34. An electronic billboard system as in claim 33, wherein the controller further adjusts the electronic display in accordance with control signals received over the wide area network from a remote computer.*

*35. An electronic billboard system as in claim 34, wherein the controller further receives multiple images from the remote workstation and an image display sequence for displaying the multiple images.*

*36. An electronic billboard system as in claim 34, wherein the controller reports a status of the electronic billboard system to the remote computer.*

*37. An electronic billboard system as in claim 24, wherein the communication interface provides a virtual private network service for communication over the wide area network.*

*38. An electronic billboard system as in claim 24, wherein the communication interface provides encryption and decryption services for communication over the wide area network.*

*39. An electronic billboard system as in claim 24, wherein the electronic display comprises an array of pixels.*

*40. An electronic billboard system as in claim 39, wherein each pixel comprises a plurality of light sources of different colors.*

*41. An electronic billboard system as in claim 40, wherein each pixel comprises light sources of four or more different colors.*

*42. An electronic billboard system as in claim 41, wherein the different colors comprise two or more shades of green.*

*43. A method for displaying an image on a light-emitting diode (LED) display, the display comprising a matrix of pixels, each pixel made up of at least four LEDs each capable of emitting light, at an individual chromaticity, the method comprising:*

*specifying a color to be displayed at a pixel;*

*selecting a color gamut from a plurality of color gamuts, each color gamut being defined by three or more of said*

*LEDs, according to the specified color and an operating characteristic; and*

*generating said specified color using said selected color gamut.*

*44. The method of claim 43, wherein one of said plurality of color gamuts is defined by at least four LEDs.*

*45. The method according to claim 43, wherein said selecting comprises:*

*selecting a specific LED within a pixel for which an operating parameter is to be optimized; and*

*selecting the color gamut most closely associated with said optimized operating parameter.*

*46. The method according to claim 43, wherein said operating characteristic is selected from the group consisting of power consumption, current draw, time usage and brilliance.*

*47. The method according to claim 43, wherein generating said specified color includes driving the selected gamut using a non-linear control circuit.*

*48. The method according to claim 47, wherein the non-linear control circuit has a characteristic function approximating human just-noticeable differences in luminance.*

*49. The method according to claim 47, wherein the non-linear control circuit has a polynomial characteristic function approximating human just-noticeable differences in luminance.*

*50. The method according to claim 47, wherein the non-linear control circuit has a exponential characteristic function approximating human just-noticeable differences in luminance.*

*51. The method according to claim 47, wherein the non-linear control circuit has a piece-wise linear characteristic function approximating human just-noticeable differences in luminance.*

*52. The method according to claim 43, wherein generating said specified color includes dividing a range of luminance into a set of increments.*

*53. The method according to claim 52, wherein the set of increments are spaced to approximate human just-noticeable differences in luminance.*

*54. The method according to claim 52, wherein the set of increments are spaced according to a polynomial function approximating human just-noticeable differences in luminance.*

*55. The method according to claim 52, wherein the set of increments are spaced according to an exponential function approximating human just-noticeable differences in luminance.*

*56. The method according to claim 52, wherein the set of increments are spaced according to a piece-wise linear function approximating human just-noticeable differences in luminance.*

*57. The method according to claim 53 further comprising:*

*detecting an output of the LED display; and*

*adjusting a range of luminance for the output of the LED display.*

*58. A light-emitting diode (LED) display system, comprising:*

*a matrix of pixels each having a plurality of LEDs, each pixel emitting light of four or more different chromaticities forming a color gamut associated with an operating parameter; and*

*a processor controlling the matrix of pixels, the processor (a) receiving information specifying each color to be displayed on the LED display system and specifying an operating characteristic for that pixel, and (b) selecting the color gamut for each pixel by matching the operating parameter of the gamut to the specified operating characteristic.*

*59. The LED display system according to claim 58, wherein the matrix of pixels is shaded using a plurality of louvers.*

*60. The LED display system according to claim 58, wherein the matrix of pixels comprises an array of pixel blocks.*

*61. The LED display system according to claim 58, wherein the processor receives feedback from a camera detecting an output of the LED display system.*

*62. The LED display system according to claim 61, wherein the processor specifies the luminance or chrominance for each pixel in the matrix of pixels in response to the output of the LED display system.*

*63. The LED display system according to claim 62, wherein the luminance or chrominance spans a range that is divided into increments with spacing corresponding to human just-noticeable differences.*

*64. The LED display system according to claim 62, wherein the luminance or chrominance spans a range that is divided into increments with spacing corresponding to a polynomial function approximating human just-noticeable differences.*

*65. The LED display system according to claim 62, wherein the luminance or chrominance spans a range that is divided into increments with spacing corresponding to an exponential function approximating human just-noticeable differences.*

*66. The LED display system of claim 62, wherein the luminance spans a range that is divided into increments with spacing corresponding to a piece-wise linear function approximating human just-noticeable differences.*

* * * * *